US011238799B2

(12) United States Patent
Ge et al.

(10) Patent No.: US 11,238,799 B2
(45) Date of Patent: Feb. 1, 2022

(54) DISPLAY PANEL AND DISPLAY DEVICE

(71) Applicant: Wuhan Tianma Micro-Electronics Co., Ltd., Wuhan (CN)

(72) Inventors: Shucheng Ge, Wuhan (CN); Guofeng Zhang, Wuhan (CN); Junqiang Wang, Wuhan (CN); Yong Yuan, Shanghai (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 18 days.

(21) Appl. No.: 16/728,892

(22) Filed: Dec. 27, 2019

(65) Prior Publication Data

US 2021/0097936 A1 Apr. 1, 2021

(30) Foreign Application Priority Data

Sep. 29, 2019 (CN) ......................... 201910936255.1

(51) Int. Cl.

*G06F 3/038* (2013.01)
*G09G 3/3258* (2016.01)
*G09G 3/3291* (2016.01)
*G09G 5/10* (2006.01)

(52) U.S. Cl.

CPC ......... *G09G 3/3258* (2013.01); *G09G 3/3291* (2013.01); *G09G 5/10* (2013.01); *G09G 2310/08* (2013.01); *G09G 2320/0233* (2013.01)

(58) Field of Classification Search

USPC ....... 345/204, 82, 63, 89; 715/764; 348/240; 257/40

See application file for complete search history.

(56) References Cited

U.S. PATENT DOCUMENTS

2008/0224966 A1* 9/2008 Cok ......................... G09G 3/32 345/82
2008/0231554 A1* 9/2008 Lee ..................... H01L 27/3216 345/63
2009/0009455 A1* 1/2009 Kimura ................ G09G 3/2074 345/89
2016/0204094 A1* 7/2016 Yang ..................... H01L 27/124 257/773
2016/0238897 A1* 8/2016 Yao ................... G02F 1/133514
2016/0357076 A1* 12/2016 Huangfu ............. G02F 1/13439

(Continued)

*Primary Examiner* — Thuy N Pardo

(74) *Attorney, Agent, or Firm* — von Briesen & Roper, s.c.

(57) ABSTRACT

A display panel includes a first display region and a second display region; the first display region includes first sub-pixels provided with first pixel density; and the second display region includes second sub-pixels provided with second pixel density, where the first pixel density is lower than the second pixel density. During one frame of picture display, a light-emitting phase of the first sub-pixel includes a first light-emitting period, and a light-emitting phase of the second sub-pixel includes a second light-emitting period; for same target brightness, the first sub-pixel emits light with first light-emitting brightness in the first light-emitting period, and the second sub-pixel emits light with second light-emitting brightness in the second light-emitting period, where the first light-emitting brightness is higher than the second light-emitting brightness; and the first light-emitting period is shorter than the second light-emitting period.

20 Claims, 24 Drawing Sheets

(56) References Cited

U.S. PATENT DOCUMENTS

| | | | | |
|---|---|---|---|---|
| 2017/0076654 | A1* | 3/2017 | Wang | G09G 3/2074<br>345/204 |
| 2018/0212198 | A1* | 7/2018 | Inoue | H05B 33/24 |
| 2019/0096970 | A1* | 3/2019 | Hou | H01L 51/56 |
| 2019/0326366 | A1* | 7/2019 | Fan et al. | H01L 27/3218<br>257/40 |
| 2020/0150770 | A1* | 1/2020 | Chaudhri et al. | H04M 1/72439<br>715/764 |
| 2020/0358963 | A1* | 3/2020 | Manzari et al. | H04N 5/232939<br>348/240 |
| 2020/0349336 | A1* | 11/2020 | Lius | G06K 9/00013 |

* cited by examiner

DISPLAY PANEL AND DISPLAY DEVICE

CROSS-REFERENCES TO RELATED APPLICATIONS

This application claims priority to Chinese patent application No. 201910936255.1 filed on Sep. 29, 2019, the disclosure of which is incorporated herein by reference in its entirety.

TECHNICAL FIELD

Embodiments of the present disclosure relate to the field of display technologies and, in particular, relate to a display panel and a display device.

BACKGROUND

With the continuous development of science and technology, more and more electronic devices with display functions are widely applied to people's daily life and work, bring great convenience to people's daily life and work, and become essential tools for people today.

An important component of an electronic device that implements a display function is a display panel. In the existing display panels, in order to meet requirements of integrating an optical and electronic element into the electronic device, it is necessary to arrange a hollowed-out region in a set region of the display panel for setting the optical and electronic element.

The arrangement of the optical and electronic element leads to different display effects of sub-pixels in the hollowed-out region and a normal display region, affecting normal display of the display panel.

SUMMARY

In view of this, the embodiments of the present disclosure provide a display panel and a display device, which are beneficial for improving the consistency of display effects of a first display region and a second display region.

In a first aspect, the embodiments of the present disclosure provide a display panel, the display panel includes a first display region and a second display region, and the first display region is reused as a sensor setting region.

The first display region includes a plurality of first sub-pixels which are provided with first sub-pixel density, and the second display region includes a plurality of second sub-pixels which are provided with second sub-pixel density, where the first sub-pixel density is lower than the second sub-pixel density.

During one frame of picture display, a light-emitting phase of the plurality of first sub-pixels includes a first light-emitting period, and a light-emitting phase of the plurality of second sub-pixels includes a second light-emitting period; for same target brightness, the plurality of first sub-pixels is configured to emit light with first light-emitting brightness during the first light-emitting period, and the plurality of second sub-pixels is configured to emit light with second light-emitting brightness during the second light-emitting period.

The first light-emitting brightness L1 and the second light-emitting brightness L2 satisfy that L1>L2; and the first light-emitting period T1 and the second light-emitting period T2 satisfy that T1<T2.

In a second aspect, the embodiments of the present disclosure further provide a display device including the display panel described in the first aspect.

In the display panel and the display device provided by the embodiments of the present disclosure, the first display region is reused as a sensor setting region, and the first pixel density of the first display region is configured to be lower than the second pixel density of the second display region, so that the transmittance of the first display region can be improved, and the sensor disposed in the first display region can receive more light signals, making the sensor operate well; meanwhile, for the same target brightness, light-emitting brightness of the first sub-pixel located in the first display region in the first light-emitting period is configured to be higher than light-emitting brightness of the second sub-pixel located in the second display region in the second light-emitting period, ensuring the light-emitting brightness of the first display region and the second display region are close to each other, and improving the display effect of the display panel; further, the first light-emitting period of the first sub-pixel is configured to be shorter than the light-emitting period of the second sub-pixel, improving a service life of the first sub-pixel and improving a service life of the entire display panel.

BRIEF DESCRIPTION OF DRAWINGS

Other features, objects and advantages of the present disclosure will become more apparent from a detailed description of non-restrictive embodiments with reference to the drawings.

DETAILED DESCRIPTION

In order to make the objects, technical solutions and advantages of the present disclosure clearer, the technical solutions of the present disclosure will be described below in detail in conjunction with the drawings in embodiments of the present disclosure and the specific embodiments. Apparently, the described embodiments are part, not all, of embodiments of the present disclosure, and based on embodiments of the present disclosure, other embodiments obtained by those skilled in the art on the premise that no creative work is done are within the scope of the present disclosure.

Figure 1:
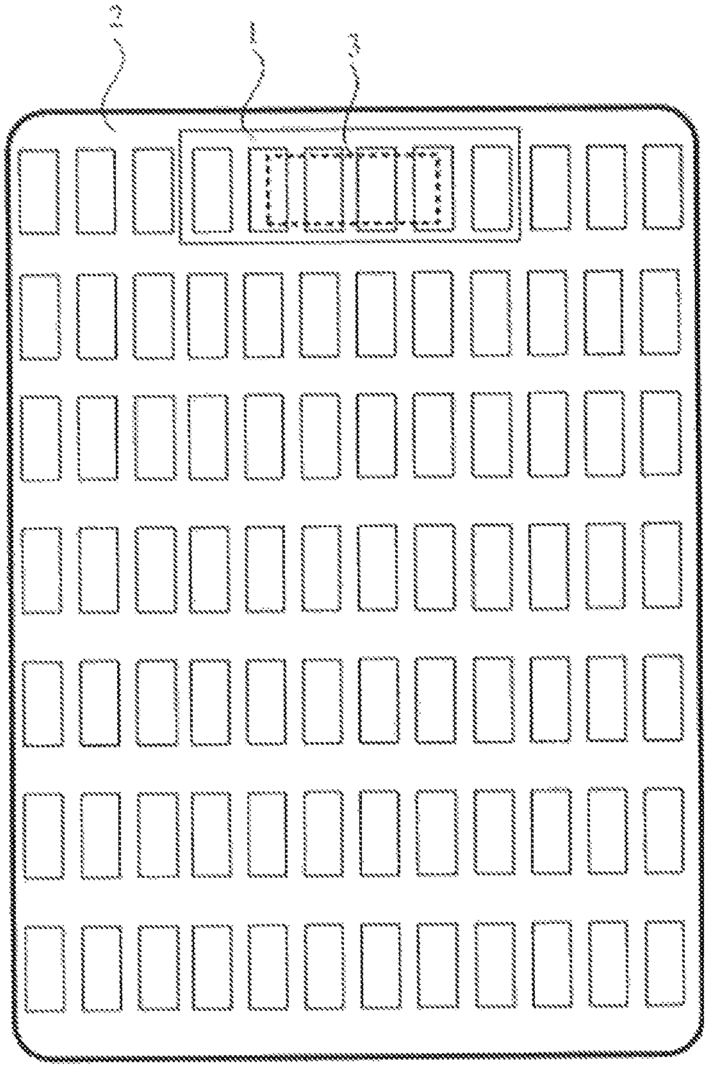
FIG. 1 (Prior Art)
FIG. 1 is a schematic structural diagram of a display panel in the related art.

FIG. 1 is a schematic structural diagram of a display panel in the related art. As shown in FIG. 1, the existing full-screen display device includes a first display region 1 and a second display region 2, and the first display region 1 is provided with an optical and electronic element 3, such as a camera or an optical sensor. A display function and a light transmittance function can be simultaneously implemented in the first display region 1. However, the camera or the optical sensor needs to receive a large amount of light during the operating process, and the first display region 1 in the existing full-screen display device is further used for display, where the display element occupies a lot of space, resulting in poor light transmittance performance of the first display region 1 and affecting normal use of the optical and electronic element 3.

The inventor has found through research that a reduction in the pixel density of the first display region 1 can increase the amount of light transmitted through the first display region 1, ensuring the normal use of the optical and electronic element 3. However, a reduction in the pixel density of the first display region 1 may cause differences in display brightness of the first display region 1 and the second display region 2, affecting the display effect of the display panel; if the driving current of the pixels in the first display region 1 is increased, although the display brightness of the first display region 1 can be improved, the service life of the pixels in the first display region 1 is also shortened, affecting the service life of the entire display panel.

Based on the above technical problems, the inventor has further developed technical solutions of the embodiments of the present disclosure. Specifically, the embodiments of the present disclosure provide a display panel, the display panel includes a first display region and a second display region, and the first display region is reused as a sensor setting region; the first display region includes a plurality of first sub-pixels which are provided with a first pixel density; the second display region includes a plurality of second sub-pixels which are provided with a second pixel density; the first pixel density is lower than the second pixel density. During one frame of picture display, a light-emitting phase of the first sub-pixel includes a first light-emitting period, and a light-emitting phase of the second sub-pixel includes a second light-emitting period; for same target brightness, the first sub-pixel is configured to emit light with first light-emitting brightness during the first light-emitting period, and the second sub-pixel is configured to emit light with second light-emitting brightness during the second light-emitting period; the first light-emitting brightness L1 and the second light-emitting brightness L2 satisfy that L1>L2; and the first light-emitting period T1 and the second light-emitting period T2 satisfy that T1<T2. According to the above technical solution, the first pixel density of the first display region is configured to be lower than the second pixel density of the second display region, so that the light transmittance of the first display region can be improved, and the sensor disposed in the first display region can receive more light signals, making the sensor operate well; and meanwhile, for the same target brightness, light-emitting brightness of the first sub-pixel located in the first display region in the first light-emitting period is configured to be higher than light-emitting brightness of the second sub-pixel located in the second display region in the second light-emitting period, ensuring the light-emitting brightness of the first display region and the second display region are close to each other, and improving the display effect of the display panel; further, the first light-emitting period of the first sub-pixel is configured to be shorter than the light-emitting period of the second sub-pixel, thereby improving a service life of the first sub-pixel and improving a service life of the entire display panel.

The above is a core idea of the present disclosure, and technical solutions in the embodiments of the present disclosure will be described clearly and completely in conjunction with the drawings in the embodiments of the present disclosure. Based on the embodiments of the present disclosure, all other embodiments obtained by those skilled in the art without creative work are within the scope of the present disclosure.

Figure 2:
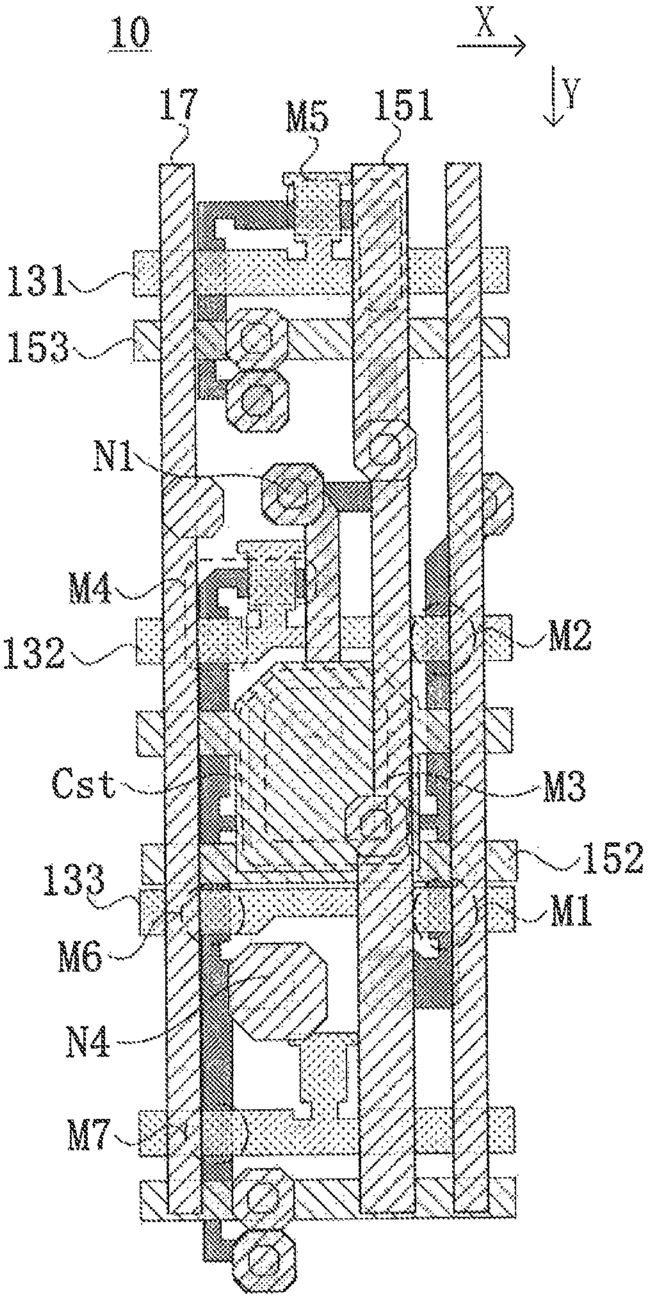
FIG. 2 is a schematic structural diagram of a pixel driving circuit according to an embodiment of the present disclosure.
Figure 3:
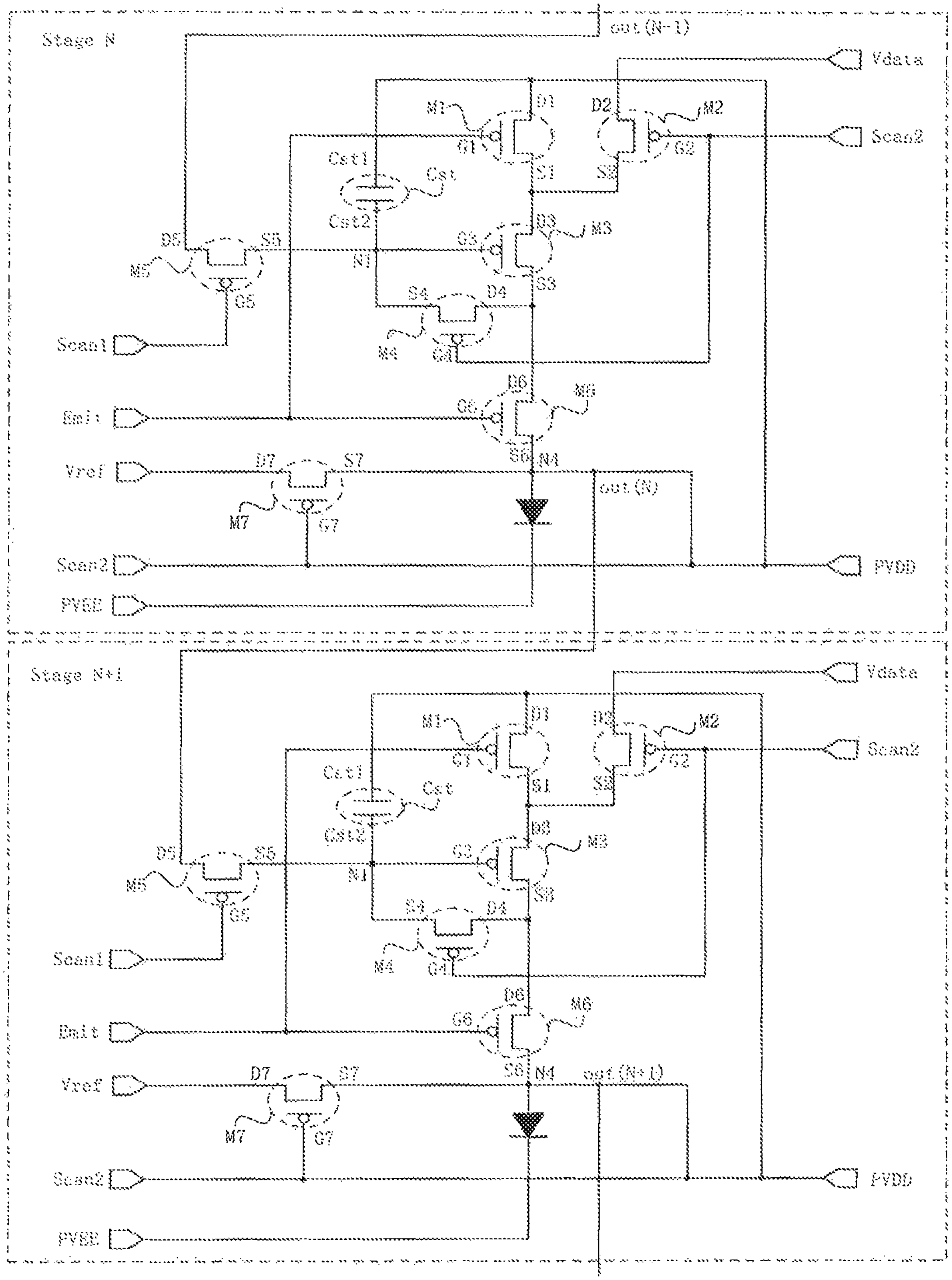
FIG. 3 is a schematic diagram of circuit elements of a pixel driving circuit according to an embodiment of the present disclosure.
Figure 4:
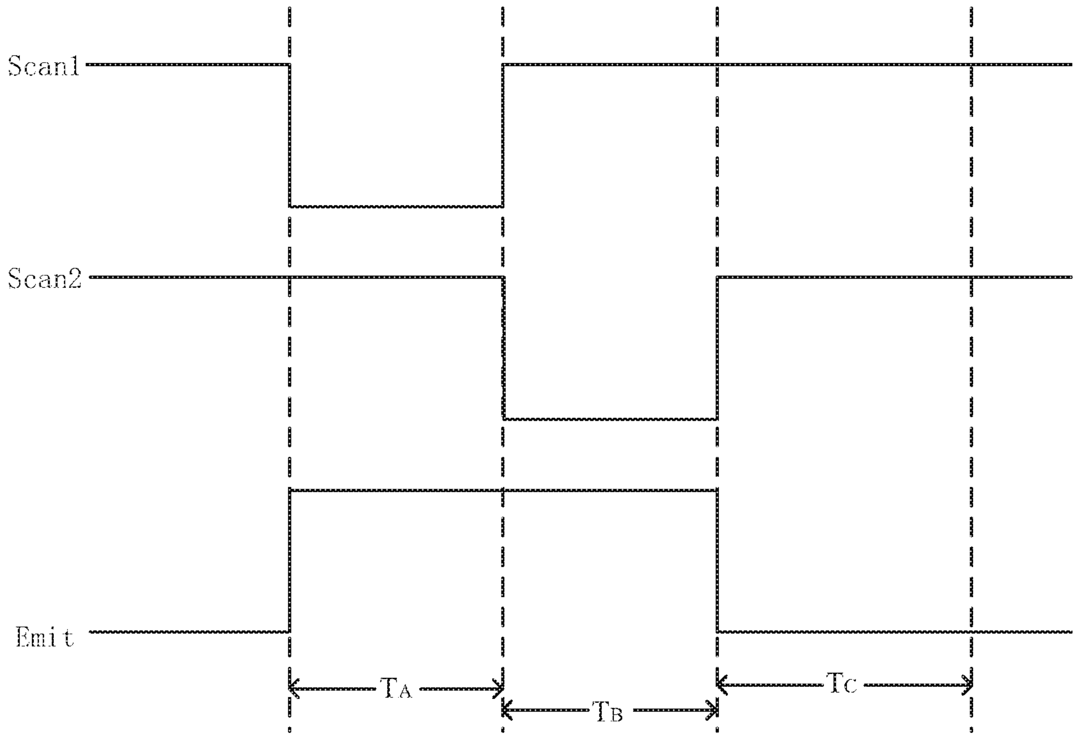
FIG. 4 is a driving timing sequence diagram of a pixel driving circuit according to an embodiment of the present disclosure.

Before the technical solution of the embodiment of the present disclosure is described in detail, the driving circuit of the pixel in the display panel is briefly described, and the 7T1C (7 transistors and 1 storage capacitor) circuit commonly used in the display panel is taken as an example for description. FIG. 2 is a schematic structural diagram of a pixel driving circuit according to an embodiment of the present disclosure, FIG. 3 is a schematic diagram of circuit elements of a pixel driving circuit according to an embodiment of the present disclosure, and FIG. 4 is a driving timing sequence diagram of a pixel driving circuit according to an embodiment of the present disclosure. As shown in FIGS. 2, 3 and 4, the display panel 10 may further include a first scanning line 131, a second scanning line 132, a light-emitting control signal line 133, a first power signal line 151, a second power signal line 152, a reference voltage line 153, and a data line 17, where the data lines 17 and the first scanning lines 131 intersect to define a pixel region, and the pixel unit 120 is disposed in the pixel region.

Exemplarily, the first scanning line 131, the second scanning line 132, the light-emitting control signal line 133, the second power line 152, and the reference voltage line 153 may be disposed in parallel, and each extend along a first direction X and are arranged along a second direction Y; where a same row of pixel driving circuits, that is, pixel driving circuits extending along the first direction X and arranged in the same linear line, are connected to a same group of first scanning line 131, second scanning line 132, light-emitting control signal line 133, second power line 152 and reference voltage line 153.

Exemplarily, the first power signal line 151 and the data line 17 may be disposed in parallel and each extend in the second direction Y; where a same column of pixel driving circuits, that is, pixel driving circuits extending along the second direction Y and arranged in the same linear line are connected to a same group of first power signal line 151 and data line 17.

Exemplarily, the first scanning line 131, the second scanning line 132, and the light-emitting control signal line 133 may be disposed at the same layer and are each formed at a first metal layer; the data line 17 and the first power signal line 151 may be disposed at the same layer and are each formed at a third metal layer; the second power signal line 152 and the reference voltage line 153 may be disposed at the same layer and are each formed on a second metal layer; and insulating layers are provided among the first metal layer, the second metal layer, and the third metal layer to electrically isolate the traces that do not have an electrical connection relationship with each other, and thereby signal crosstalk and disturbances are avoided, and then the pixel driving circuit 121 is enabled to drive the light-emitting element 122 to emit light.

Scan1 is a first scanning signal inputted to the first scanning line 131, Scan2 is a second scanning signal inputted to the second scanning line 132, Emit is a light-emitting control signal inputted to the light-emitting control signal line 133, Vdata is a data signal inputted to a data line 17, Vref is a reference voltage signal inputted to the reference voltage line 153, PVDD is a first power signal inputted to the first power signal line 151, and PVEE is a second power signal for forming a current loop of the light-emitting element.

Figure 5:
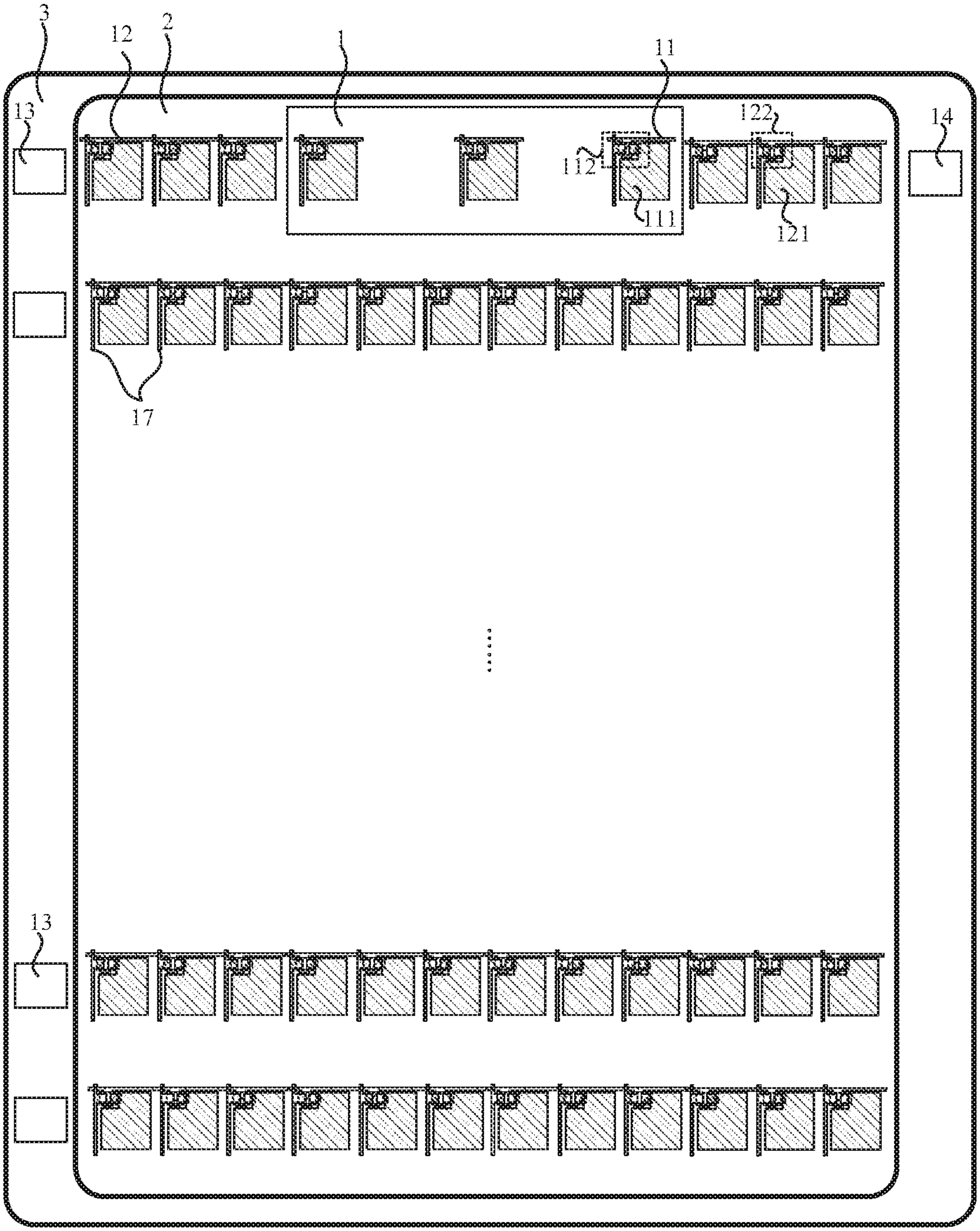
FIG. 5 is a schematic structural diagram of another display panel according to an embodiment of the present disclosure.

Exemplarily, with continued reference to FIGS. 4 and 5, the pixel driving circuit 121 may include: a first light-emitting control transistor M1, a data signal writing transistor M2, a driving transistor M3, an additional transistor M4, a storage cell reset transistor M5 (that is, a first reset transistor M5), a second light-emitting control transistor M6, a light-emitting reset transistor M7 (that is, a second reset transistor M7), and a storage capacitor Cst.

The first scanning line 131 is electrically connected to a gate electrode G5 of the storage cell reset transistor M5, the drain electrode D5 of the storage cell reset transistor M5 is electrically connected to a source electrode S7 of the light-emitting reset transistor M7 at a previous stage (in a previous row) (the drain electrode D5 of the storage cell reset transistor M5 in the first row is electrically connected to the reference voltage line 153), and the source electrode S5 of the storage cell reset transistor M5 is electrically connected to the source electrode S4 of the additional transistor M4, the gate electrode G3 of the driving transistor M3, and a second plate Cst2 of the storage capacitor Cst; the drain electrode D4 of the additional transistor M4 is electrically connected to the source electrode S3 of the driving transistor M3 and the drain electrode D6 of the second light-emitting control transistor M6, and the gate electrode G4 of the additional transistor M4 is electrically connected to the second scanning line 132; the light-emitting control signal line 133 is electrically connected to the gate electrodes (including the gate electrode G1 of the first light-emitting control transistor M1 and the gate electrode G6 of the second light-emitting control transistor M6) of the light-emitting control transistors, the drain electrode D1 of the first light-emitting control transistor M1 is electrically connected to the second power signal line 152, the source electrode S6 of the second light-emitting control transistor M6 is electrically connected to a metal anode of the light-emitting element 122 and the source electrode S7 of the light-emitting reset transistor M7, the source electrode S3 of the driving transistor M3 is electrically connected to the drain electrode D6 of the second light-emitting control transistor M6, the drain electrode D3 of the driving transistor M3 is electrically connected to the source electrode S of the first light-emitting control transistor M1 and the source electrode S2 of the data signal writing transistor M2, and the gate electrode G3 of the driving transistor M3 is electrically connected to the second plate Cst2 of the storage capacitor Cst. Optionally, the gate electrode G3 of the driving transistor M3 is reused as the second plate Cst2 of the storage capacitor Cst; the first plate Cst1 of the storage capacitor Cst is electrically connected to the first power signal line 151; the gate electrode G2 of the data signal writing transistor M2 is electrically connected to the second scanning line 132, and the drain electrode D2 of the data signal writing transistor M2 is electrically connected to the data line 17.

The storage cell reset transistor M5 and the additional transistor M4 may be double-gate transistors for reducing the leakage current and improving precision of control of the pixel driving circuit over the driving current, which is therefore conducive to improving accuracy of control over the light-emitting brightness of the light-emitting element.

It is to be noted that for transistors M1 to M7 as circled in FIG. 2, the gate electrode G7 of the light-emitting reset transistor M7 is electrically connected to the first scanning line 131 in a next row, and the first scanning line 131 in the next row is electrically connected to the second scanning line 132 in the current row. Therefore, for the current row, the gate electrode G7 of the light-emitting reset transistor M7 is electrically connected to the second scanning line 132 in the current row.

The storage cell reset transistor M5 is used for providing a reset voltage for the storage capacitor Cst before the display phase, and the light-emitting reset transistor M7 is used for providing an initialization voltage for the light-emitting element 122 before the display phase.

In the above-mentioned embodiment, each of the transistors M1 to M7 may be a P-type transistor or an N-type transistor, which is not limited in the embodiments of the present disclosure. Exemplarily, the following describes the operating principle of the pixel driving circuit in detail with reference to FIG. 4 by taking the transistors M1 to M7 as P-type transistors and the reference voltage signal Vref as a low-level signal as an example.

In a time period $T_A$ (an initialization phase), a signal Scan1 in the first scanning line 131 is a low-level signal, and a signal Scan2 in the second scanning line 132 and a signal Emit in the light-emitting control signal line 133 are high-level signals. At the moment, the storage cell reset transistor M5 is turned on. The pixel driving unit in a first row is taken as an example, a potential Vref of the reference voltage line 153 is applied to the second plate Cst2 of the storage capacitor Cst via the storage cell reset transistor M5. That is, a potential of a first node N1 (that is a metal part N1) is the reference voltage Vref. At the moment, a potential of the gate electrode G3 of the driving transistor M3 is also the reference voltage Vref.

In a time period $T_B$ (a data signal voltage writing phase), the signal Scan2 in the second scanning line 132 is a low-level signal, and the signal Scan1 in the first scanning line 131 and the signal Emit in the light-emitting control signal line 133 are high-level signals. At the moment, the data signal writing transistor M2 and the additional transistor M4 are turned on. Simultaneously, the potential of the gate electrode G3 of the driving transistor M3 is the reference voltage Vref, which is also a low potential, the driving transistor M3 is also turned on, and a data signal Vdata in the data line 17 is applied to the first node N1 via the data signal writing transistor M2, the driving transistor M3 and the additional transistor M4, and the potential of the first node N1 is gradually pulled high by the potential of the data line 17. When a voltage of the gate electrode of the driving transistor M3 is pulled up to a voltage whose difference from a voltage of the source electrode S3 of the driving transistor M3 is less than or equal to a threshold voltage $V_{th}$ of the driving transistor M3, the driving transistor M3 is in a cut-off state. Since the source electrode S3 of the driving transistor M3 is electrically connected to the data line 17 via the data signal writing transistor M2, a potential of the source electrode S3 of the driving transistor M3 is maintained to be $V_{data}$. Thus, when the driving transistor M3 is cut off, the potential of the gate electrode G3 of the driving transistor M3 is $(V_{data}-|V_{th}|)$, where $V_{data}$ is a value of the voltage in the data line and $|V_{th}|$ is a threshold voltage of the driving transistor M3.

At the moment, a voltage difference Vc between the first plate Cst1 of the storage capacitor Cst and the second plate Cst2 of the storage capacitor Cst is as follows:

$$V_C = V1 - V2 = V_{PVDD} - (V_{data} - |V_{th}|).$$

V1 represents the potential of the first plate Cst1, V2 represents the potential of the second plate Cst2, and $V_{PVDD}$ is a voltage value of the power signal in the first power signal line 151.

In the data signal voltage writing phase, the voltage difference Vc between the first plate Cst1 of the storage capacitor Cst and the second plate Cst2 of the storage capacitor Cst includes the threshold voltage $|V_{th}|$ of the driving transistor M3. That is, in the data signal voltage writing phase, the threshold voltage $V_{th}$ of the driving transistor M3 is detected and stored in the storage capacitor Cst.

In the data signal voltage writing phase, the light-emitting reset transistor M7 is also turned on, and the potential Vref of the reference voltage line 153 is written to a first electrode (that is, a metal anode 140) of the light-emitting element 122 by the light-emitting reset transistor M7, and a potential of the first electrode of the light-emitting element 122 is initialized so that the influence of the voltage of the first electrode of the light-emitting element 122 in the previous frame on the voltage of the first electrode of the light-emitting element 122 in the following frame, and the display uniformity is further improved.

In a time period $T_C$ (the light-emitting phase, or the display phase), the signal Emit in the light-emitting control signal line 133 is a low-level signal, and the signal Scan1 in the first scanning line 131 and the signal Scan2 in the second scanning line 132 are high-level signals. At the moment, the first light-emitting control transistor M1 and the second light-emitting control transistor M6 are turned on, the voltage of the source electrode S3 of the driving transistor M3 is $V_{PVDD}$, and a voltage difference between the source electrode of the driving transistor M3 and the gate electrode of the driving transistor M3 is as follows:

$$V_{sg} = V_{PVDD} - (V_{data} - |V_{th}|).$$

The leakage current of the driving transistor M3 drives the light-emitting element 122 to emit light, and the leakage current $I_d$ of the driving transistor M3 satisfies the following formula:

$$I_d = \frac{1}{2}\mu C_{ox}\frac{W}{L}(V_{sg} - |V_{th}|)^2 = \frac{1}{2}\mu C_{ox}\frac{W}{L}(V_{PVDD} - V_{data} + |V_{th}| - |V_{th}|)^2 = \frac{1}{2}\mu C_{ox}\frac{W}{L}(V_{PVDD} - V_{data})^2.$$

μ is carrier mobility of the driving transistor M3, W and L are respectively a width and a length of a channel of the first light-emitting control transistor M1 or the second light-emitting control transistor M6, and $C_{ox}$ is a capacitance of a gate oxide layer per unit area of the driving transistor M3, $V_{PVDD}$ is a value of the voltage of the first power signal line 151, and $V_{data}$ is a value of the voltage of the data line 17.

The structure and operating principle of the pixel driving circuit in the display panel have been described in detail above. With reference to the above description, the technical solution of the embodiment of the present disclosure is described in detail below.

Figure 6:
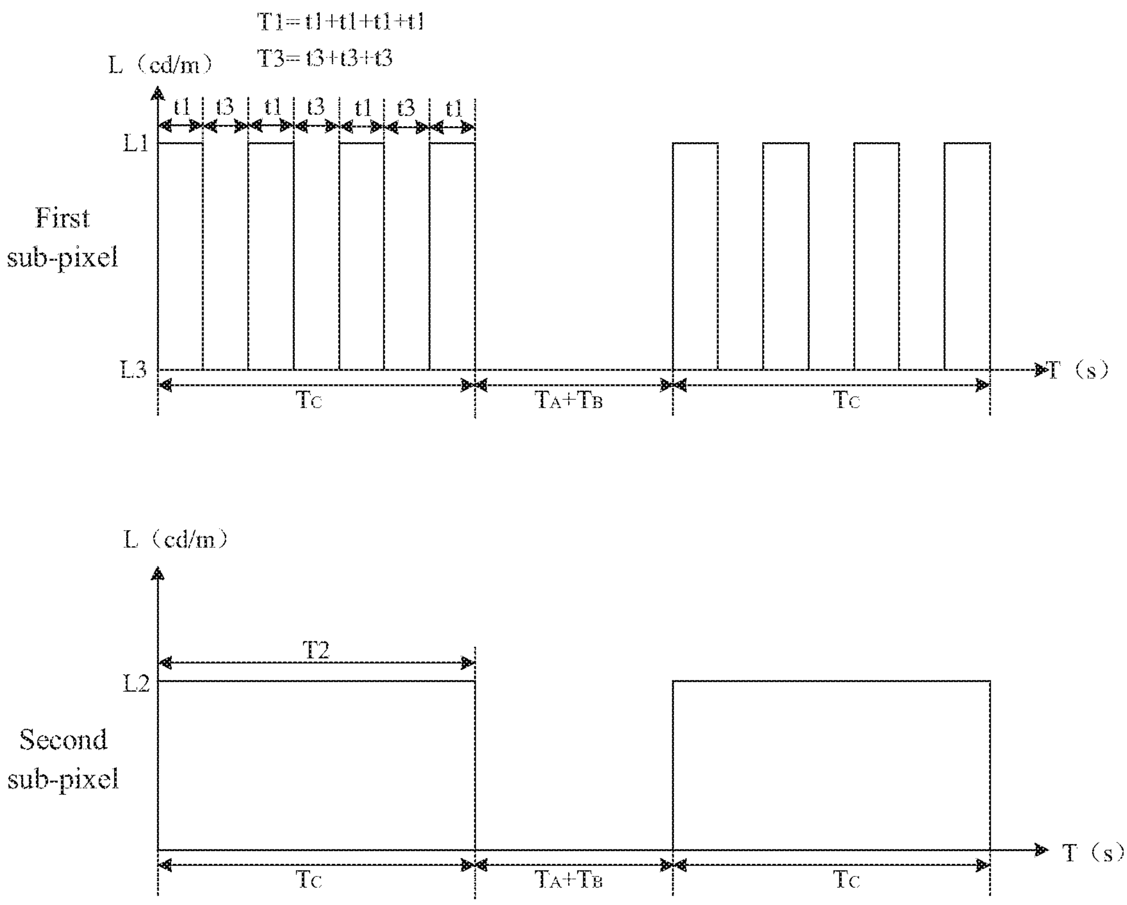
FIG. 6 is a schematic diagram of light-emitting brightness according to an embodiment of the present disclosure.

FIG. 5 is a schematic structural diagram of a display panel according to an embodiment of the present disclosure, and FIG. 6 is a schematic diagram of light-emitting brightness according to an embodiment of the present disclosure. As shown in FIGS. 5 and 6, the display panel provided in the embodiment of the present disclosure includes a first display region 1 and a second display region 2, where the first display region 1 is reused as a sensor setting region; the first display region 1 includes a plurality of first sub-pixels 11 which are provided with first pixel density; the second display region 2 includes a plurality of second sub-pixels 12 which are provided with second pixel density; the first pixel density is lower than the second pixel density. During one frame of picture display, a light-emitting phase of the first sub-pixel 11 includes a first light-emitting period, and a light-emitting phase of the second sub-pixel includes a second light-emitting period; for the same target brightness, the first sub-pixel 11 emits light with first light-emitting brightness during the first light-emitting period, and the second sub-pixel 12 emits light with second light-emitting brightness during the second light-emitting period; where the first light-emitting brightness L1 and the second light-emitting brightness L2 satisfy that L1>L2, and the first light-emitting period T1 and the second light-emitting period T2 satisfy that T1<T2.

Exemplarily, the duration of one frame of picture display includes the above-mentioned initialization time period TA (initialization phase), time period $T_B$ (data signal voltage writing phase) and time period $T_C$ (light-emitting phase, or display phase), the light-emitting phase of the first sub-pixel 11 is the time period $T_C$ corresponding to the first sub-pixel 11, and the light-emitting phase of the second sub-pixel 12 is the time period $T_C$ corresponding to the second sub-pixel 12, as shown in FIG. 6.

With continued reference to FIG. 5, in order to increase the light transmittance of the first display region 1, the first pixel density of the first sub-pixels 11 is configured to be lower than the second pixel density of the second sub-pixels 12, so as to ensure that the optical sensor disposed in the first display region 1 can receive better light flux and improve the sensitivity of the optical sensor during operation. With continued reference to FIG. 6, the first sub-pixel 11 emits light with first light-emitting brightness L1 in a first light-emitting period T1, and the second sub-pixel 12 emits light with second light-emitting brightness L2 in a second light-emitting period T2. For the same target brightness, the first light-emitting brightness L1 and the second light-emitting brightness L2 satisfy that L1>L2, and the first light-emitting brightness L1 and the second light-emitting brightness L2 are configured to satisfy that L1>L2 so that the relatively high light-emitting brightness of the first sub-pixel 11 compensates for the display difference caused by the lower pixel density of the first sub-pixel 11 to ensure that the display difference between the first display region 1 and the second display region 2 in the display panel is small, and the display effect of the display panel is improved. Further, in the case where the first sub-pixel 11 operates with relatively high light-emitting brightness, maintaining the high light-emitting brightness of the first sub-pixel 11 at all times will shorten the service life of the first sub-pixel 11, and therefore, the first light-emitting period T1 and the second light-emitting period T2 are configured to satisfy that T1<T2, and then the service life of the first sub-pixel 11 is extended by reducing the light-emitting period during which the first sub-pixel 11 emits light with relatively high brightness. In addition, since a display refresh frequency of the display panel is high, users cannot perceive the difference between the first light-emitting period and the second light-emitting period, and the user experience will not be affected.

Optionally, the display panel provided in the embodiment of the present disclosure may be an organic light-emitting diode display panel, the organic light-emitting diode display panel may include a base substrate, and the display panel provided in the embodiment of the present disclosure may include the base substrate, the driving circuit, and the organic light-emitting unit (not shown in the figure), where the base substrate, the driving circuit, and the organic light-emitting unit are sequentially stacked. The base substrate may be a rigid substrate or a flexible substrate, and the material of the base substrate is not limited in the embodiments of the present disclosure. The driving circuit may sequentially include an active layer, a gate electrode insulating layer, a gate electrode layer, an interlayer insulating layer, and a source/drain electrode layer which are located on a side of the base substrate. The gate electrode layer may form the gate electrode, the scanning line, and a first electrode of the storage capacitor in the driving circuit, and the source/drain layer may form the source electrode, the drain electrode, the data line, and the power source signal line in the driving circuit. The materials of the gate electrode insulating layer and the interlayer insulating layer may include an oxide of silicon or a nitride of silicon, which is not limited in the embodiments of the present disclosure. The driving circuit may further include an intermediate insulating layer and an intermediate metal layer that are stacked between the gate electrode layer and the interlayer insulating layer in a direction facing away from the base substrate. The intermediate metal layer is generally used for forming a second electrode of the storage capacitor and a reference voltage line. The organic light-emitting unit may include an anode, a pixel defining layer, an organic light-emitting layer, and a cathode layer. A pixel defining layer includes a pixel defining layer opening that is in one-to-one correspondence with the anode and exposes the body of the anode. The display panel may further include an encapsulation layer (not shown in the figure) located on a side of the organic light-emitting unit facing away from the base substrate and used for protecting the organic light-emitting unit from water and oxygen.

In summary, in the display panel of the embodiment of the present disclosure, the first pixel density of the first display region is configured to be lower than the second pixel density of the second display region, so that the light transmittance of the first display region can be improved, and the sensor disposed in the first display region can receive more light signals, making the sensor operate well; meanwhile, for the same target brightness, light-emitting brightness of the first sub-pixel located in the first display region in the first light-emitting period is configured to be higher than light-emitting brightness of the second sub-pixel located in the second display region in the second light-emitting period, ensuring the light-emitting brightness of the first display region and the second display region are close to each other, and improving the display effect of the display panel; further, the first light-emitting period of the first sub-pixel is configured to be shorter than the light-emitting period of the second sub-pixel, improving a service life of the first sub-pixel and improving a service life of the entire display panel.

Optionally, with continued reference to FIG. 6, the light-emitting phase of the first sub-pixel 11 further includes a third period, and the first sub-pixel 11 emits light with third light-emitting brightness L3 in a third period T3, where the third light-emitting brightness L3 and the second light-emitting brightness L2 satisfy that L3<L2, and the first light-emitting period T1, the second light-emitting period T2, and the third period T3 satisfy that T1+T3=T2.

Exemplarily, as shown in FIG. 6, the light-emitting phase of the first sub-pixel 11 may further include a third period T3, and the first sub-pixel 11 may or may not emit light during the third period T3, which is not limited in the embodiment of the present disclosure; however, the third light-emitting brightness L3 of the first sub-pixel 11 in the third period T3 and the second light-emitting brightness L2 of the second sub-pixel 12 satisfy that L3<L2. Thus, the first sub-pixel 11 has a higher light-emitting brightness than the second sub-pixel 12 in the first light-emitting period T1 and a lower light-emitting brightness than the second sub-pixel 12 in the third period T3, ensuring the first sub-pixel 11 and the second sub-pixel 12 have the same or similar light-emitting brightness in the entire light-emitting phase, ensuring the first sub-pixel 11 and the second sub-pixel 12 have the same or similar service life, and ensuring a longer service life of the overall display panel. Further, the first light-emitting period T1, the second light-emitting period T2, and the third period T3 satisfy that T1+T3=T2 to ensure that the first sub-pixel 11 and the second sub-pixel 12 have the same light-emitting period and the same operating timing sequence, and that the first sub-pixel 11 and the second sub-pixel 12 may use the same driving control method. The driving control method of the first sub-pixel 11 and the second sub-pixel 12 is simple and saves power consumption of the display panel.

Optionally, with continued reference to FIG. 6, the first light-emitting period T1 includes a plurality of first light-emitting sub-periods t1, and the third period T3 includes a plurality of third sub-periods t3; in the light-emitting phase of the first sub-pixel 11, the plurality of first light-emitting sub-periods and the plurality of third sub-periods alternate in a manner of one first light-emitting sub-period followed by one third sub-period.

Exemplarily, the first light-emitting sub-period t1 and the third sub-period t3 alternate, that is, corresponding to a period equal to the second light-emitting period T2, the first light-emitting sub-period t1 and the third sub-period t3 are alternately performed, further ensuring that the user cannot distinguish between the first light-emitting sub-period t1 and the third sub-period 3. From the point of view of the user, in the entire light-emitting phase of the first sub-pixel 11, the first sub-pixel 11 keeps emitting light, and a good user experience is ensured.

Further, in order to fully ensure that the user cannot distinguish between the first light-emitting sub-period t1 and the third sub-period t3, the third sub-period t3 may be configured to satisfy that 5 ms≤t3≤15 ms within which the user cannot distinguish the first sub-pixel 11 is in a non-light-emitting state. From the visual observation effect of the user, the first sub-pixel 11 keeps emitting light, and a good user experience is ensured.

Figure 7:
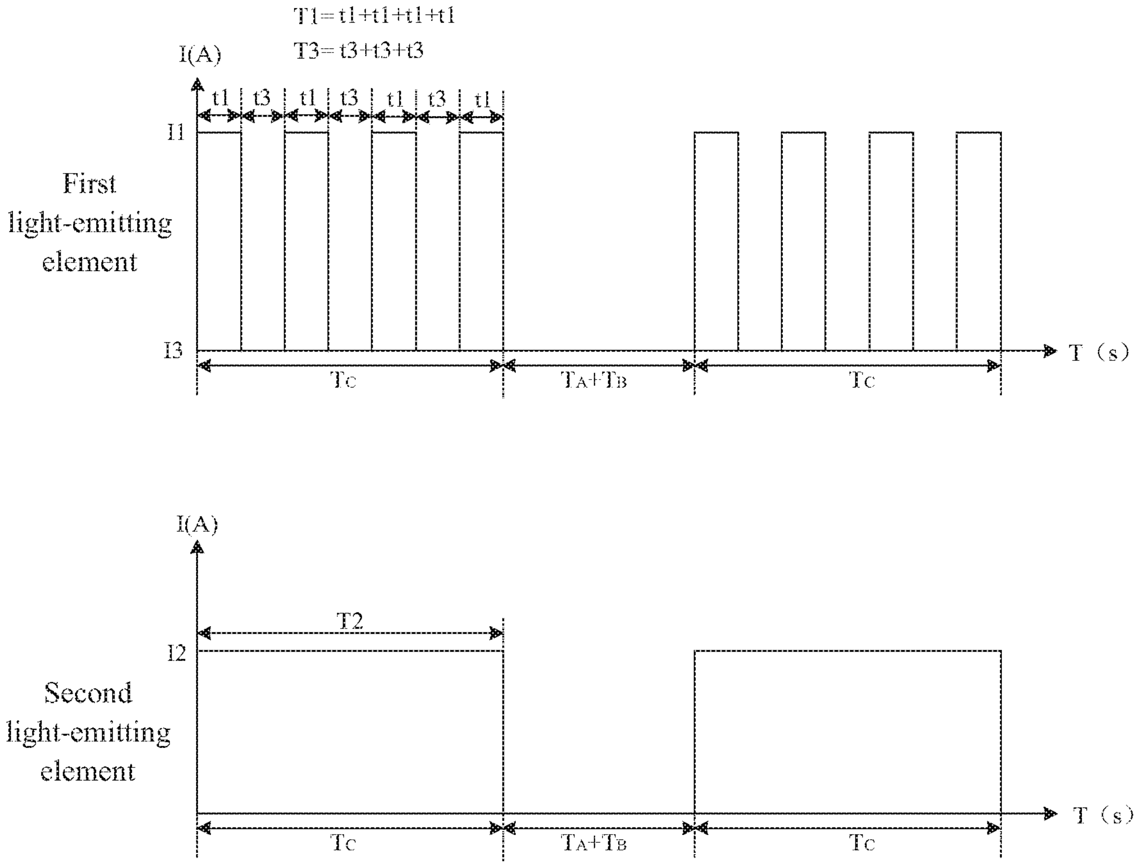
FIG. 7 is a schematic diagram of a driving current according to an embodiment of the present disclosure.

Optionally, FIG. 7 is a schematic diagram of a driving current according to an embodiment of the present disclosure. As shown in FIGS. 5 and 7, the first sub-pixel 11 includes a first light-emitting element 111 and the second sub-pixel 12 includes a second light-emitting element 121; for the same target brightness, the first light-emitting element 111 receives the first driving current signal I1 within the first light-emitting period T1, the second light-emitting element 121 receives the second driving current signal I2 within the second light-emitting period T2, and the first light-emitting element 111 receives the third driving current signal I3 within the third period T3; where the first driving current signal I1, the second driving current signal I2, and the third driving current signal I3 satisfy that I1>I2>I3.

With continued reference to FIG. 5, the first sub-pixel 11 may include a first light-emitting element 111, and the second sub-pixel 12 may include a second light-emitting element 121, where the first light-emitting element 111 and the second light-emitting element 121 may both be organic light-emitting diodes, which are both current-driven-type light-emitting elements, that is, the larger the driving current, the higher the light-emitting brightness.

With continued reference to FIG. 7, the first driving current signal I1, the second driving current signal I2, and the third driving current signal I3 satisfy that I1>I2>I3, ensuring that the first light-emitting element 111 has the highest light-emitting brightness in the first light-emitting period T1, that the second light-emitting element 121 has the second highest light-emitting brightness in the second light-emitting period T2, and that the first light-emitting element 111 has the lowest light-emitting brightness in the third period T3. The first light-emitting element 111 has a higher light-emitting brightness than the second light-emitting element 121 in the first light-emitting period T1 and a lower light-emitting brightness than the second light-emitting element 121 in the third period T3, ensuring that the light-emitting brightness of the first light-emitting element 111 and the second light-emitting element 121 in the entire light-emitting phase is the same or similar and that the service lives of the first light-emitting element 111 and the second light-emitting element 121 are the same or similar, and then a longer service life of the overall display panel is ensured.

Optionally, the first driving current signal I1, the second driving current signal I2, and the third driving current signal I3 are configured to satisfy that I1>I2>I3, many different implementations exist for such configuration, and two feasible implementations are taken as examples for description in the following.

Firstly, the case where the driving current is adjusted by adjusting the turn-on degree of the switch transistor in the pixel driving circuit is taken as an example for description.

Figure 8:
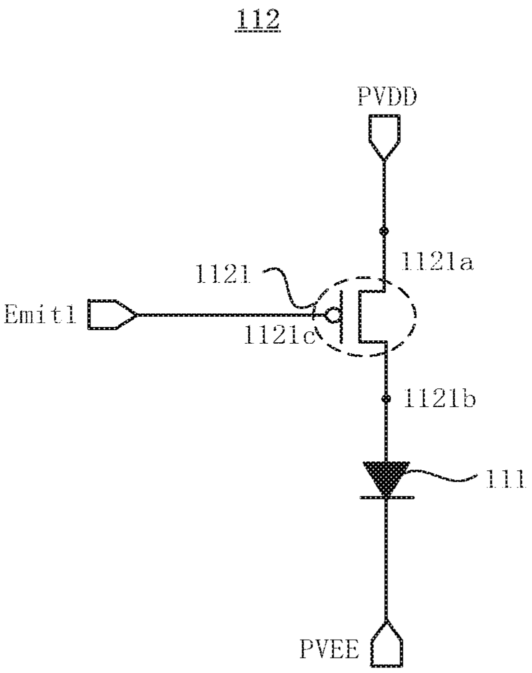
FIG. 8 is a schematic diagram of part of circuit elements of a first pixel driving circuit according to an embodiment of the present disclosure.
Figure 9:
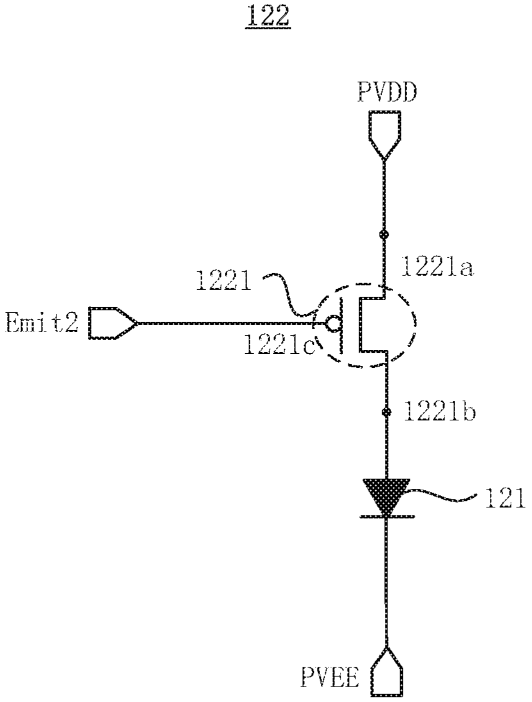
FIG. 9 is a schematic diagram of part of circuit elements of a second pixel driving circuit according to an embodiment of the present disclosure.

Optionally, FIG. 8 is a schematic diagram of part of circuit elements of a first pixel driving circuit according to an embodiment of the present disclosure, and FIG. 9 is a schematic diagram of part of circuit elements of a second pixel driving circuit according to an embodiment of the present disclosure. With continued reference to FIG. 5, FIG. 8, and FIG. 9, the first sub-pixel 11 further includes a first pixel driving circuit 112 including a first switch transistor 1121, and the first switch transistor 1121 includes a first input terminal 1121*a*, a first output terminal 1121*b*, and a first control terminal 1121*c*, where the first input terminal 1121*a* is electrically connected to the signal source, and the first output terminal 1121*b* is electrically connected to the first light-emitting element 111; the second sub-pixel 12 further includes a second pixel driving circuit 122 including a second switch transistor 1221, and the second switch transistor 1221 includes a second input terminal 1221*a*, a second output terminal 1221*b*, and a second control terminal 1221*c*, where the second input terminal 1221*a* is electrically connected to the signal source, and the second output terminal 1221*b* is electrically connected to the second light-emitting element 121; the first switch transistor 1121 and the second switch transistor 1221 are thin film transistors of a same type; in the first light-emitting period T1, the first switch transistor 1121 operates in the linear region, and a potential difference between the gate electrode of the first switch transistor 1121 and the source electrode of the first switch transistor 1121 is a first potential difference V1; in the second light-emitting period T2, the second switch transistor 1221 operates in the linear region, and a potential difference between the gate electrode of the second switch transistor 1221 and the source electrode of the second switch transistor 1221 is a second potential difference V2; in the third period T3, the first switch transistor 1121 operates in the linear region, and a potential difference between the gate electrode of the first switch transistor 1121 and the source electrode of the first switch transistor 1121 is a third potential difference V3; for the same target brightness, the first potential difference V1, the second potential difference V2, and the third potential difference V3 satisfy that |V1|>|V2|>|V3|.

Exemplarily, the numbers and relative positional relationships of electronic elements in the first pixel driving circuit 112 and the second pixel driving circuit 122 are the same. The first switch transistor 1121 may be M1 or M6 in the 7T1C pixel driving circuit structure described in FIG. 3, and is disposed in series between the signal source (that is, the PVDD signal) and the light-emitting element, and FIG. 8 takes the M1 transistor in the 7T1C pixel driving circuit structure described in FIG. 3 as the first switch transistor 1121 as an example for description. The second switch transistor 1221 may be M1 or M6 in the 7T1C pixel driving circuit structure described in FIG. 3, and is disposed in series between the signal source (that is, the PVDD signal) and the light-emitting element, and FIG. 9 takes the M1 transistor in the 7T1C pixel driving circuit structure described in FIG. 3 as the second switch transistor 1221 as an example for description. In addition, the first switch transistor 1121 and the second switch transistor 1221 are thin film transistors of a same type, for example, both are P-type thin film transistors or both are N-type thin film transistors. FIG. 8 takes the first switch transistor 1121 as a P-type thin film transistor as an example for description, and FIG. 9 takes the second switch transistor 1221 as a P-type thin film transistor as an example for description. When the first switch transistor 1121 is a P-type thin film transistor, the first input terminal 1121*a* is the drain electrode of the first switch transistor 1121, the first output terminal 1121*b* is the source electrode of the first switch transistor 1121, the first control terminal 1121*c* is the gate electrode of the first switch transistor 1121, and the potential difference between the gate electrode of the first switch transistor 1121 and the source electrode of the first switch transistor 1121 is the potential difference between the first control terminal 1121*c* of the first switch transistor 1121 and the first output terminal 1121*b* of the first switch transistor 1121. Similarly, when the second switch transistor 1221 is a P-type thin film transistor, the second input terminal 1221*a* is the drain electrode of the second switch transistor 1221, the second output terminal 1121*b* is the source electrode of the second switch transistor 1221, the second control terminal 1121*c* is the gate electrode of the second switch transistor 1221, and the potential difference between the gate electrode of the second switch transistor 1221 and the source electrode of the second switch transistor 1221 is the potential difference between the second control terminal 1121*c* of the second switch transistor 1221 and the second output terminal 1121*b* of the second switch transistor 1221.

Figure 10:
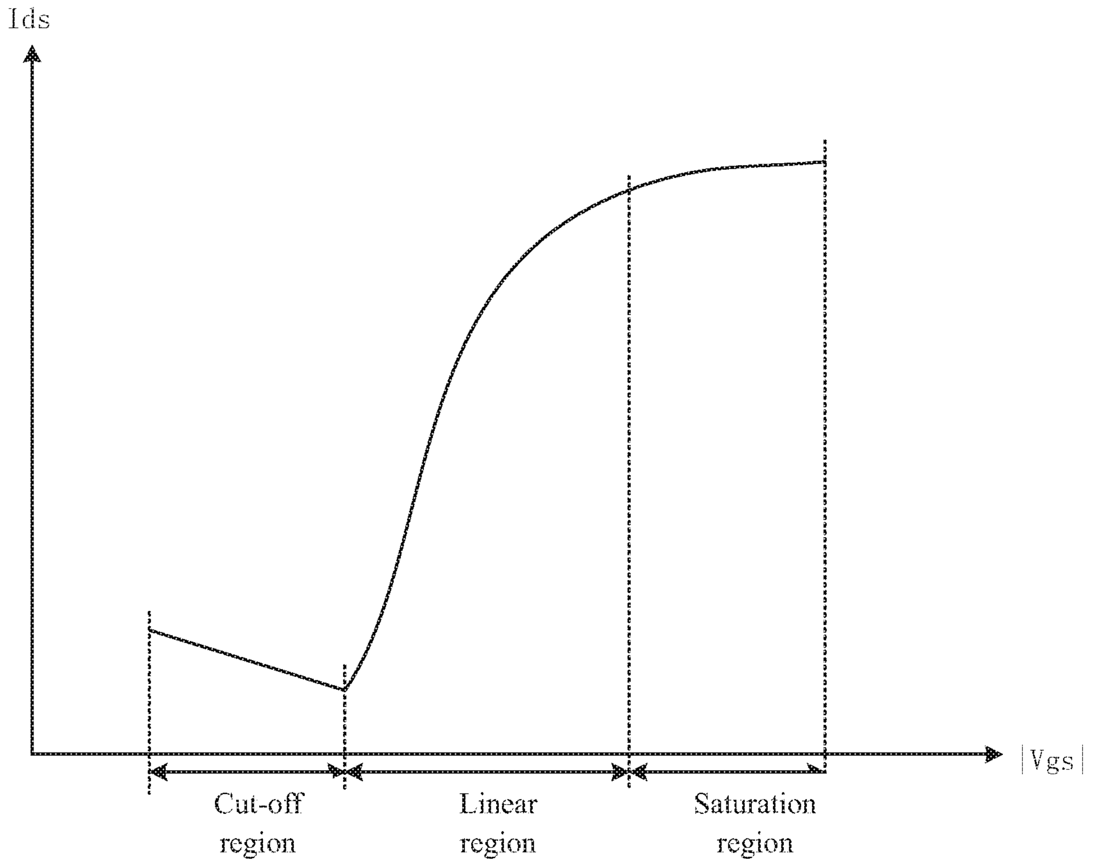
FIG. 10 is a schematic diagram of an operating curve of a thin film transistor according to an embodiment of the present disclosure.

FIG. 10 is a schematic diagram of an operating curve of a thin film transistor according to an embodiment of the present disclosure. As shown in FIG. 10, when the thin film transistor operates in the linear region, the greater the potential difference between the gate electrode and the source electrode, the larger the current between the drain electrode of the thin film transistor and the source electrode of the thin film transistor. Corresponding to the first switch transistor 1121, the greater the potential difference between the first control terminal 1121*c* and the first output terminal 1121*b* is, the larger the current between the first input terminal 1121*a* and the first output terminal 1121*b* is, the greater the turn-on degree of the first switch transistor 1121 is, the larger the driving current received by the first light-emitting element 111 is, and the higher the light-emitting brightness of the first light-emitting element 111 is. Similarly, corresponding to the second switch transistor 1221, the greater the potential difference between the second control terminal 1221*c* and the second output terminal 1221*b* is, the larger the current between the second input terminal 1221*a* and the second output terminal 1221*b* is, the greater the turn-on degree of the second switch transistor 1221 is, the larger the driving current received by the second light-emitting element 121 is, and the higher the light-emitting brightness of the second light-emitting element 121 is. Therefore, in order to ensure that the light-emitting brightness of the first light-emitting element 111 and the second light-emitting element 121 is the same or similar in the entire light-emitting phase, and that the service lives of the first light-emitting element 111 and the second light-emitting element 121 are the same or similar, in the embodiment of the present disclosure, for the same target brightness, the first potential difference V1, the second potential difference V2, and the third potential difference V3 satisfy that $|V1|>|V2|>|V|$ to ensure that the first light-emitting element 111 has the highest light-emitting brightness in the first light-emitting period T1, the second light-emitting element 121 has the second highest light-emitting brightness in the second light-emitting period T2, and the first light-emitting element 111 has the lowest light-emitting brightness in the third period T3.

Optionally, when the first switch transistor 1121 and the second switch transistor 1221 both are P-type thin film transistors, for the same target brightness, the first potential difference V1, the second potential difference V2, and the third potential difference V3 satisfy that $V1<V2<V3<0$; when the first switch transistor 1121 and the second switch transistor 1221 both are N-type thin film transistors, for the same target brightness, the first potential difference V1, the second potential difference V2, and the third potential difference V3 satisfy that $V1>V2>V3>0$.

Figure 11:
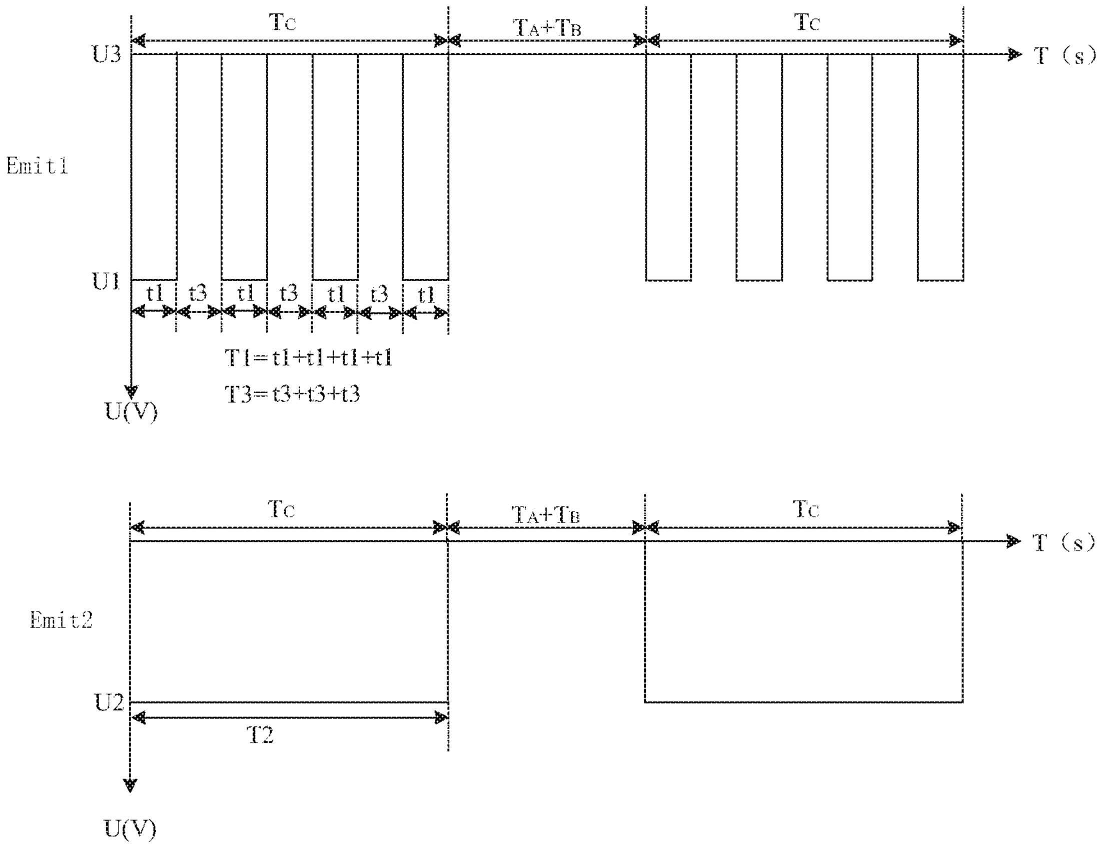
FIG. 11 is a schematic diagram of a light-emitting control signal according to an embodiment of the present disclosure.

Optionally, FIG. 11 is a schematic diagram of a light-emitting control signal according to an embodiment of the present disclosure. With continued reference to FIGS. 5, 8, 9, and 11, the display panel provided in the embodiments of the present disclosure further includes a non-display region 3, the non-display region 3 is provided with a first light-emitting control circuit 13 and a second light-emitting control circuit 14, where the first light-emitting control circuit 13 is configured to output a first light-emitting control signal Emit1 to the first control terminal 1121*c*, and the second light-emitting control circuit 14 is configured to output a second light-emitting control signal Emit2 to the second control terminal 1221*c*; in the first light-emitting period T1, the first light-emitting control signal Emit1 includes a first level signal U1; in the second light-emitting period T2, the second light-emitting control signal Emit2 includes a second level signal U2; and in the third period T3, the first light-emitting control signal Emit1 includes a third level signal U3; where $|U3|<|U2|<|U1|$.

Exemplarily, the first switch transistor 1121 and the second switch transistor 1221 are thin film transistors of the same type, and the first pixel driving circuit 112 and the second pixel driving circuit 122 have the same number of electronic elements, the same relative positional relationship of electronic elements, and the same other control signals received except that the received light-emitting control signals are different, therefore, for display with the same target brightness, the potential of the first output terminal 1121*b* of the first switch transistor 1121 is the same as the potential of the second output terminal 1221*b* of the second switch transistor 1221. Moreover, the potential of the first control terminal 1121*c* is the potential of the first light-emitting control signal Emit1, and the potential of the second control terminal 1221*c* is the potential of the second light-emitting control signal Emit2. Therefore, in the embodiment of the present disclosure, the first level signal U1 of the first light-emitting control signal Emit1 in the first light-emitting period T1, the second level signal U2 of the second light-emitting control signal Emit2 in the second light-emitting period T2, and the third level signal U3 of the first light-emitting control signal Emit1 in the third period T3 satisfy that |U3|<|U2|<|U1|, ensuring that for the same target brightness, the first potential difference V1 between the first control terminal 1121*c* of the first switch transistor 1121 and the first output terminal 1121*b* of the first switch transistor 1121, the second potential difference V2 between the second control terminal 1221*c* of the second switch transistor 1221 and the second output terminal 1221*b* of the second switch transistor 1221, the third potential difference V3 between the first control terminal 1121*c* of the first switch transistor 1121 and the first output terminal 1121*b* of the first switch transistor 1121 satisfy that |V1|>|V2|>|V3|, ensuring that the first light-emitting element 111 has the highest light-emitting brightness in the first light-emitting period T1, the second light-emitting element 121 has the second highest light-emitting brightness in the second light-emitting period T2, and the first light-emitting element 111 has the lowest light-emitting brightness in the third period T3, ensuring that the light-emitting brightness of the first light-emitting element 111 and the second light-emitting element 121 in the entire light-emitting phase is the same or similar and that the service lives of the first light-emitting element 111 and the second light-emitting element 121 are the same or similar, and then a longer service life of the overall display panel is ensured.

Optionally, when the first switch transistor 1121 and the second switch transistor 1221 both are P-type thin film transistors, for the same target brightness, the first level signal U1, the second level signal U2, and the third level signal U3 satisfy that U1<U2<U3<0; and when the first switch transistor 1121 and the second switch transistor 1221 both are N-type thin film transistors, for the same target brightness, the first level signal U1, the second level signal U2, and the third level signal U3 satisfy that U1>U2>U3>0.

According to the description of the above-mentioned embodiment, the first light-emitting element 111 may or may not emit light in the third period, and it is merely necessary to ensure that the light-emitting brightness L3 of the first light-emitting element 111 in the third period and the light-emitting brightness L2 of the second light-emitting element 121 in the second light-emitting period satisfy that L3<L2. The specific light-emitting situation of the first light-emitting element 111 in the third period is described below.

Firstly, a case where the first light-emitting element 111 does not emit light in the third period will be described.

With continued reference to FIGS. 6 and 11, in the third period T3, the first switch transistor 1211 operates in the cut-off region, and the potential difference between the gate electrode (first control terminal 1211*c*) of the first switch transistor 1211 and the source electrode (first output terminal 1211*b*) of the first switch transistor 1211 is the third potential difference V3 satisfying that |V3|≤|Vth|; the third light-emitting brightness L3 satisfies that L3=0; where Vth is a threshold voltage of the first switch transistor 1211.

Exemplarily, when the third potential difference V3 between the gate electrode (first control terminal 1211*c*) of the first switch transistor 1211 and the source electrode (first output terminal 1211*b*) of the first switch transistor 1211 satisfies that |V3|≤|Vth|, the first switch transistor 1211 is not turned on, the PVDD signal provided by the signal source cannot be transmitted to the first light-emitting element 111, and the first light-emitting element 111 does not emit light, that is, the third light-emitting brightness L3 of the first light-emitting element 111 in the third period satisfies that L3=0.

A case where the first light-emitting element 111 emits light in the third period, and where the light-emitting brightness L3 of the first light-emitting element 111 in the third period and the light-emitting brightness L2 of the second light-emitting element 121 in the second light-emitting period satisfy that L3<L2 is described below.

Figure 12:
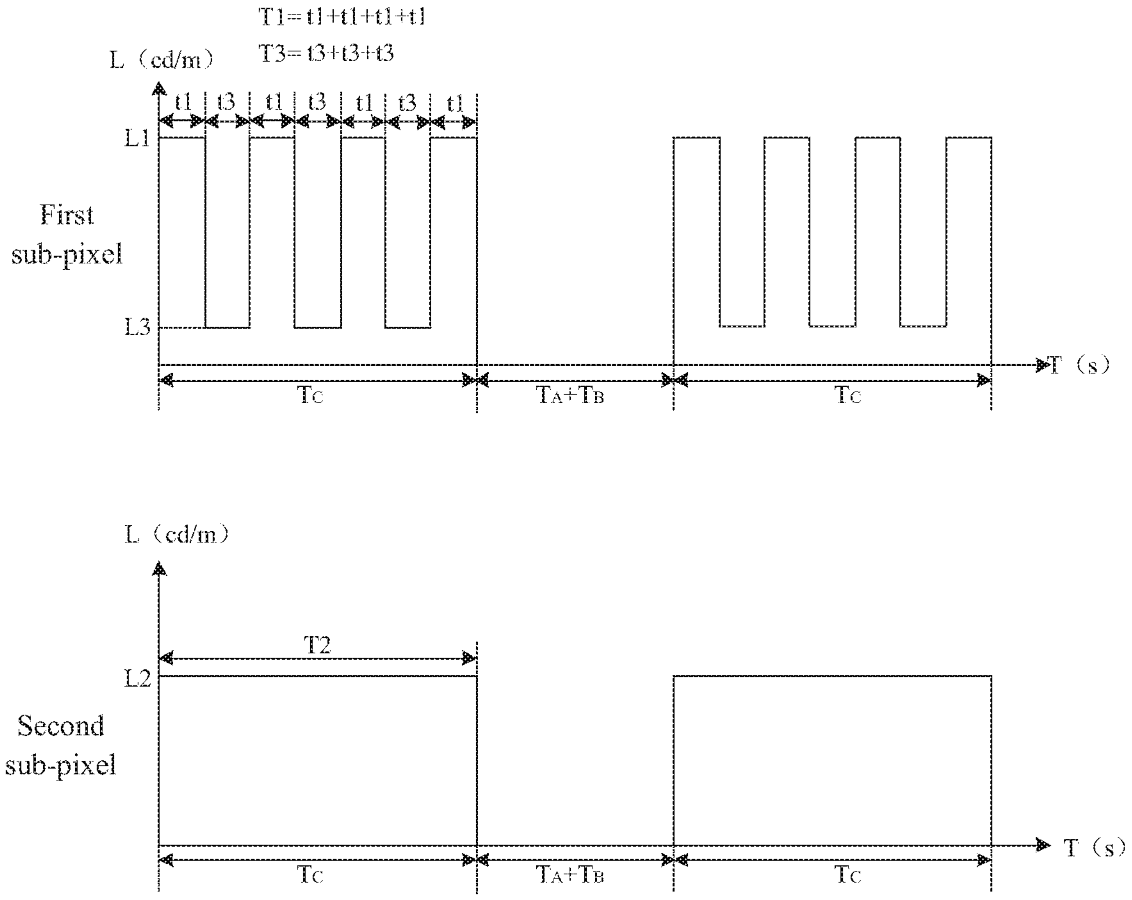
FIG. 12 is a schematic diagram of another light-emitting brightness according to an embodiment of the present disclosure.
Figure 13:
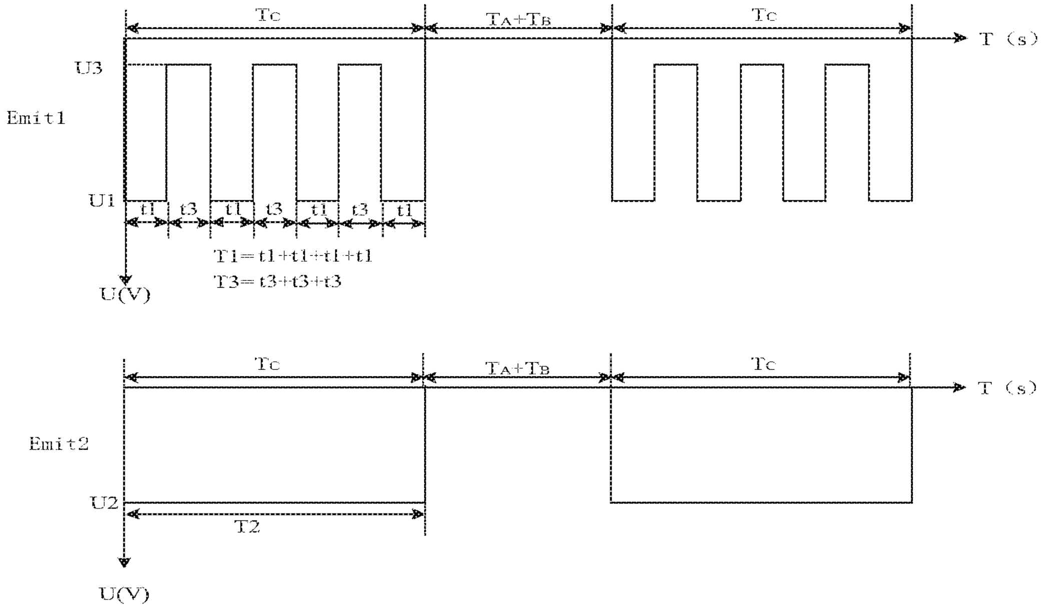
FIG. 13 is a schematic diagram of another light-emitting control signal according to an embodiment of the present disclosure.

FIG. 12 is a schematic diagram of another light-emitting brightness according to an embodiment of the present disclosure, and FIG. 13 is a schematic diagram of another light-emitting control signal according to an embodiment of the present disclosure. As shown in FIGS. 12 and 13, in the third period T3, the first switch transistor 1211 operates in the linear region, and the potential difference between the gate electrode (first control terminal 1211*c*) of the first switch transistor 1211 and the source electrode (first output terminal 1211*b*) of the first switch transistor 1211 is the third potential difference V3 satisfying that |V3|>|Vth|; where Vth is a threshold voltage of the first switch transistor 1211, and the third light-emitting brightness L3 satisfies that L3>0.

Exemplarily, when the third potential difference V3 between the gate electrode (first control terminal 1211*c*) of the first switch transistor and the source electrode (first output terminal 1211*b*) of the first switch transistor 1211 satisfies that |V3|>|Vth|, the first switch transistor 1211 is turned on, the PVDD signal provided by the signal source is transmitted to the first light-emitting element 111, and the first light-emitting element 111 emits light, that is, the third light-emitting brightness L3 of the first light-emitting element 111 in the third period satisfied that L3>0.

It is to be noted that in the third period, whether the first switch transistor 1211 is turned on and whether the first light-emitting element 111 emits light is not limited in the embodiment of the present disclosure. It is merely necessary to ensure that the light-emitting brightness L3 of the first light-emitting element 111 in the third period is lower than the light-emitting brightness L2 of the second light-emitting element 121 in the second light-emitting period, so as to ensure that the technical problem of fast damage of the first light-emitting element 111 due to the relatively high light-emitting brightness in the first light-emitting period can be compensated for, so that the light-emitting life of the first light-emitting element 111 is extended, the light-emitting lives of the first light-emitting element 111 and the second light-emitting element 121 are ensured to be the same or similar, and the service life of the entire display panel is extended.

The above has described the case where the driving current is adjusted by adjusting the turn-on degrees of the switch transistors (the first switch transistor and the second switch transistor) in the pixel driving circuits (the first pixel driving circuit and the second pixel driving circuit). It can be known from the above description that when the switch transistor operates in the linear region, the light-emitting brightness of the light-emitting element can be ensured by adjusting the magnitude of the light-emitting control signal, so that the service life of the light-emitting element is further adjusted, and the service life of the overall display panel is extended.

Further, according to the solution for adjusting the driving current by adjusting the turn-on degree of the switch transistors in the pixel driving circuits, it is not necessary to adjust the signal source voltage signal and the data voltage signal of the data line, and the driving current of the entire row can be controlled only by adjusting the timing sequence of the light-emitting control signal outputted by the light-emitting control signal, which is simple and feasible. In addition, the control method of controlling the timing sequence of the light-emitting control signal by a driver integrated circuit (IC) is simple. Optionally, in some embodiments of the present disclosure, for the same target brightness, the first switch transistor is in a normal turn-on state in the first light-emitting period T1, that is, in the saturation region; the second switch transistor in the second light-emitting period T2 is in the linear region, and the first switch transistor in the third period T3 is transformed to be in the linear region or the cut-off region via the control signal. Therefore, the timing sequence is simplified, and the power consumption of the circuit is reduced.

Next, the case where the driving current is adjusted by adjusting the data voltage signal received by the light-emitting element is taken as an example for description.

Figure 14:
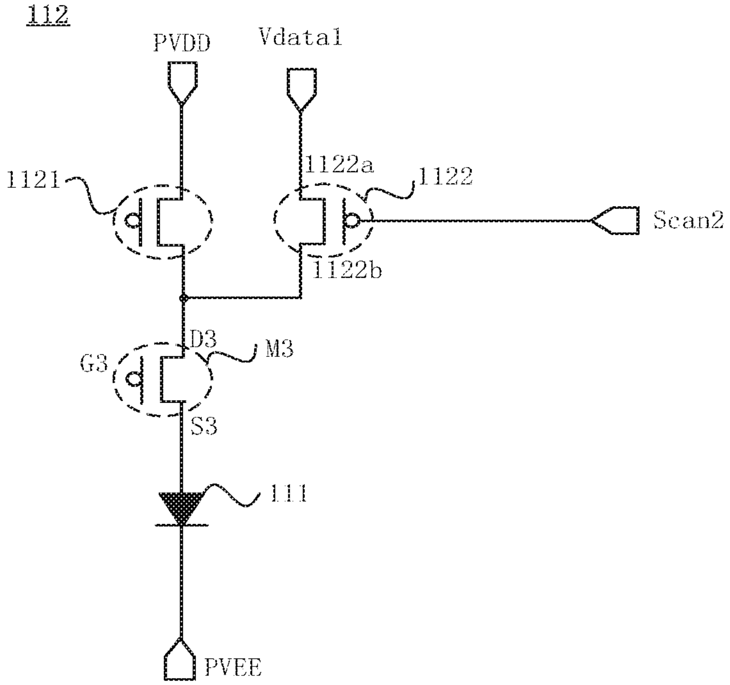
FIG. 14 is a schematic diagram of part of circuit elements of another first pixel driving circuit according to an embodiment of the present disclosure.
Figure 15:
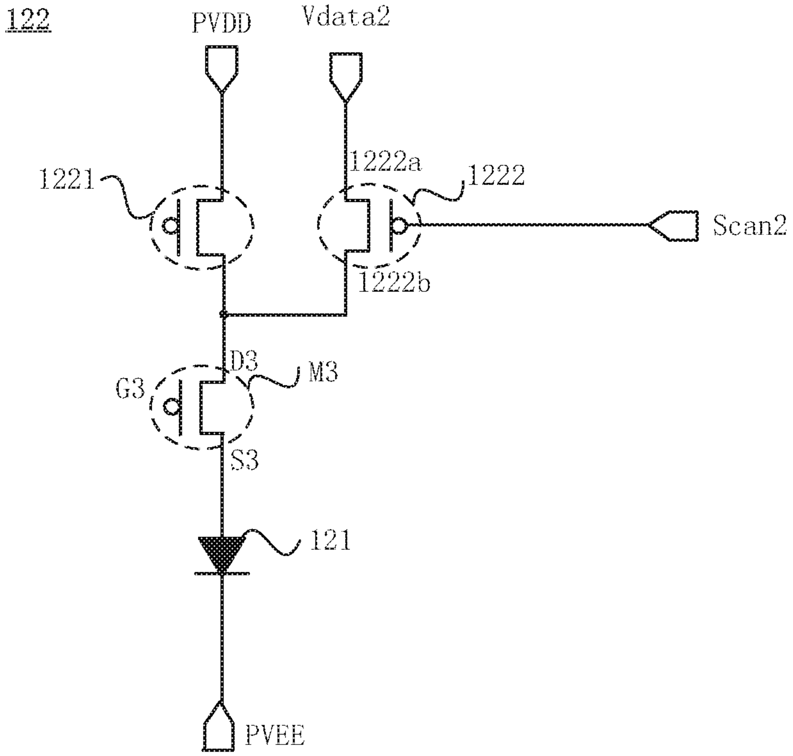
FIG. 15 is a schematic diagram of part of circuit elements of another second pixel driving circuit according to an embodiment of the present disclosure.
Figure 16:
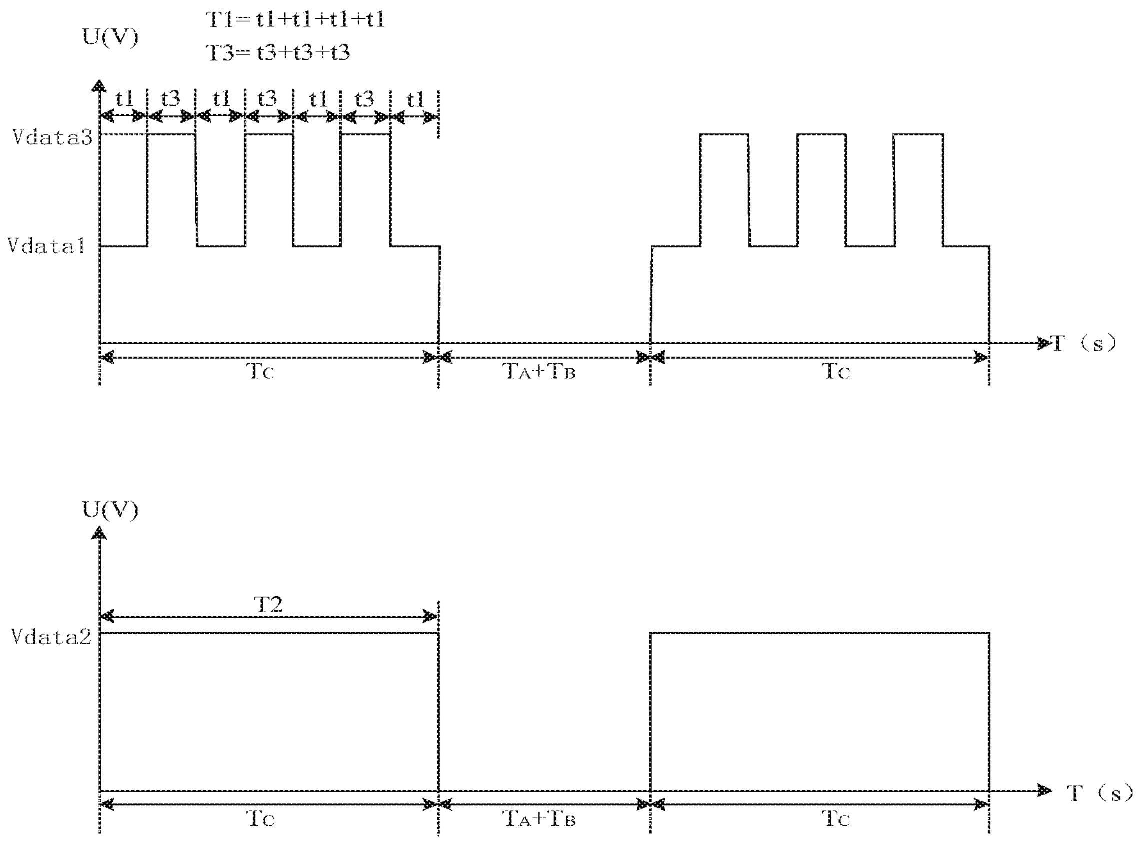
FIG. 16 is a schematic diagram of a data voltage signal according to an embodiment of the present disclosure.

FIG. 14 is a schematic diagram of part of circuit elements of another first pixel driving circuit according to an embodiment of the present disclosure, and FIG. 15 is a schematic diagram of part of circuit elements of another second pixel driving circuit according to an embodiment of the present disclosure, and FIG. 16 is a schematic diagram of a data voltage signal according to an embodiment of the present disclosure. With reference to FIGS. 4, 5, 14, 15 and 16, the first sub-pixel 11 further includes a first pixel driving circuit 112 including a first switch transistor 1121; and the second sub-pixel 12 further includes a second pixel driving circuit 122 including a second switch transistor 1221; the first switch transistor 1121 and the second switch transistor 1221 are thin film transistors of the same type and both operate in the saturation region; the display panel further includes a plurality of data lines 17; the first pixel driving circuit 112 further includes a first data writing transistor 1122 including a third input terminal 1122*a* and a third output terminal 1122*b*, where the third input terminal 1122*a* is electrically connected to the data line 17, and the third output terminal 1122*b* is electrically connected to the first light-emitting element 111; the second pixel driving circuit 122 further includes a second data writing transistor 1222 including a fourth input terminal 1222*a* and a fourth output terminal 1222*b*, where the fourth input terminal 1222*a* is electrically connected to the data line 17, and the fourth output terminal 1222*b* is electrically connected to the second light-emitting element 121; the first data writing transistor 1122 and the second data writing transistor 1222 are thin film transistors of the same type; in the first light-emitting period T1, the third input terminal 1122*a* is used for receiving the first data voltage signal Vdata1 provided by the data line 17, and the potential difference between the signal source voltage signal Pvdd and the first data voltage signal Vdata1 is a fourth potential difference V4; in the second light-emitting period T2, the fourth input terminal 1222*a* is used for receiving the second data voltage signal Vdata2 provided by the data line 17, and the potential difference between the signal source voltage signal Pvdd and the second data voltage signal Vdata2 is a fifth potential difference V5; in the third period T3, the third input terminal 1122*a* is used for receiving the third data voltage signal Vdata3 provided by the data line 17, and the potential difference between the signal source voltage signal Pvdd and the third data voltage signal Vdata3 is sixth potential difference V6; for the same target brightness, the fourth potential difference V4, the fifth potential difference V5, and the sixth potential difference V6 satisfy that |V4|>|V5|>|V6|.

Exemplarily, the numbers and relative positional relationships of electronic elements in the first pixel driving circuit 112 and the second pixel driving circuit 122 are the same. The first switch transistor 1121 may be M1 or M6 in the 7T1C pixel driving circuit structure described in FIG. 3, and is disposed in series between the signal source (that is, the PVDD signal) and the light-emitting element, and the first data writing transistor 1122 may be M2 in the 7T1C pixel driving circuit structure described in FIG. 3 for receiving the data voltage signal. The second switch transistor 1221 may be M1 or M6 in the 7T1C pixel driving circuit structure described in FIG. 3, and is disposed in series between the signal source (that is, the PVDD signal) and the light-emitting element, and the second data writing transistor 1222 may be M2 in the 7T1C pixel driving circuit structure described in FIG. 3 for receiving the data voltage signal. In addition, the first switch transistor 1121 and the second switch transistor 1221 are thin film transistors of the same type, for example, both are P-type thin film transistors or both are N-type thin film transistors; and the first data writing transistor 1122 and the second data writing transistor 1222 are thin film transistors of the same type, for example, both are P-type thin film transistors or both are N-type thin film transistors. FIG. 14 takes the first switch transistor 1121 and the first data writing transistor 1122 both as P-type thin film transistors as an example, and FIG. 15 takes the second switch transistor 1221 and the second data writing transistor 1222 both as P-type thin film transistors as an example for description. When the first data writing transistor 1122 is a P-type thin film transistor, the third input terminal 1122*a* is the drain electrode of the first data writing transistor 1122, and the third output terminal 1122*b* is the source electrode of the first data writing transistor 1122. Similarly, when the second data writing transistor 1222 is the P-type thin film transistor, the fourth input terminal 1222*a* is the drain electrode of the second data writing transistor 1222, and the fourth output terminal 1222*b* is the source electrode of the second data writing transistor 1222.

It can be known from the schematic diagram of an operating curve of a thin film transistor shown in FIG. 10 that when the thin film transistor is in the saturation region, the current between the source electrode and drain electrode of the thin film transistor does not change much with a continued increase in the potential difference between the gate electrode and source electrode of the thin film transistor. Therefore, when the first switch transistor 1121 and the second switch transistor 1221 both operate in the saturation region, it is difficult to achieve the adjustment of the light-emitting brightness of the first light-emitting element 111 and the second light-emitting element 121 via the light-emitting control signal.

It can be known from the operating principle of the pixel driving circuit that the leakage current $I_d$ of the driving transistor M3 satisfies the following formula:

$$I_d = \frac{1}{2}\mu C_{ox}\frac{W}{L}(V_{sg} - |V_{th}|)^2 = \frac{1}{2}\mu C_{ox}\frac{W}{L}(V_{PVDD} - V_{data} + |V_{th}| - |V_{th}|)^2 = \frac{1}{2}\mu C_{ox}\frac{W}{L}(V_{PVDD} - V_{data})^2.$$

It can be known from the above formula that increasing the signal source voltage signal Pvdd received by the driving transistor M3 or decreasing the data voltage signal Vdata can increase the leakage current of the driving transistor M3, thereby adjusting the light-emitting brightness of the light-emitting element. Since the signal source voltage signal Pvdd is provided by the signal line provided on the entire surface, the signal source voltage signal Pvdd received by the circuit in different pixel regions is the same. Therefore, the light-emitting brightness of the light-emitting element can be adjusted by adjusting the data voltage signals Vdata received by different pixel driving circuits.

Based on the above-mentioned principle for analysis, and with continued reference to the schematic diagram of the data voltage signal provided in FIG. 16, it can be known that in the embodiment of the present disclosure, the first data voltage signal Vdata1 received by the third input terminal 1122*a* in the first light-emitting period T1, the second data voltage signal Vdata2 received by the fourth input terminal 1222*a* in the second light-emitting period T2, and the third data voltage signal Vdata3 received by the third input terminal 1222*a* in the third period T3 satisfy that Vdata1<Vdata2<Vdata3 to ensure that the fourth potential difference V4 between the signal source voltage signal Pvdd and the first data voltage signal Vdata1, the fifth potential difference V5 between the signal source voltage signal Pvdd and the second data voltage signal Vdata1, and the sixth potential difference V6 between the signal source voltage signal Pvdd and the third data voltage signal Vdata3 satisfy that |V4|>|V5|>|V6| to ensure that the first driving current I1 received by the first light-emitting element 111 in the first light-emitting period T1, the second driving current I2 received by the second light-emitting element 121 in the second light-emitting period T2 and the third driving current I3 received by the first light-emitting element 111 the third period T3 satisfy that I1>I2>I3 to ensure that the first light-emitting element 111 has the highest light-emitting brightness in the first light-emitting period T1, the second light-emitting element 121 has the second highest light-emitting brightness in the second light-emitting period T2, and the first light-emitting element 111 has the lowest light-emitting brightness in the third period T3. The first light-emitting element 111 has a higher light-emitting brightness than the second light-emitting element 121 in the first light-emitting period T1, and a lower light-emitting brightness than the second light-emitting element 121 so as to ensure that the light-emitting brightness of the first light-emitting element 111 and the second light-emitting element 121 in the entire light-emitting phase is the same or similar, the service lives of the first light-emitting element 111 and the second light-emitting element 121 are the same or similar, and then a longer service life of the overall display panel is ensured.

The above has described the case where the driving current is adjusted by adjusting the data voltage signals received by the data writing transistors (the first data writing transistor and the second data writing transistor) in the pixel driving circuits (the first pixel driving circuit and the second pixel driving circuit). It can be known from the above description that when the switch transistor operates in the saturation region, the light-emitting brightness of the light-emitting element can be ensured by adjusting the data voltage signal received by the data writing transistor, so that the service life of the light-emitting element is further adjusted, and the service life of the overall display panel is ensured.

In summary, the case where the driving current is adjusted by adjusting the turn-on degree of the switch transistor in the pixel driving circuit, and the case where the driving current is adjusted by adjusting the data voltage signal received by the data writing transistor in the pixel driving circuit used to achieve different light-emitting brightness of different light-emitting elements have been described in detail. It can be known from the above description that the service lives of sub-pixels located in different display regions can be adjusted by adjusting the light-emitting brightness of different light-emitting elements, and the service life of the entire display panel can be extended.

The above embodiments describe how to adjust the light-emitting brightness of the sub-pixels in different display regions to ensure that the service lives of the sub-pixels in different display regions are the same or similar. It can be known that for sub-pixels of different colors, sub-pixels of different colors have different light-emitting efficiency, so in order to ensure good color mixing effect among different sub-pixels, it is necessary to use a relatively large driving current to drive sub-pixels with lower light-emitting efficiency to emit light, and use a relatively small driving current to drive sub-pixels with higher light-emitting efficiency to emit light. Under different driving currents, sub-pixels of different light-emitting colors also have different service lives, resulting in a lower service life of the overall display panel. The following describes how to adjust the service lives of sub-pixels of different light-emitting colors to be the same or similar.

Figure 17:
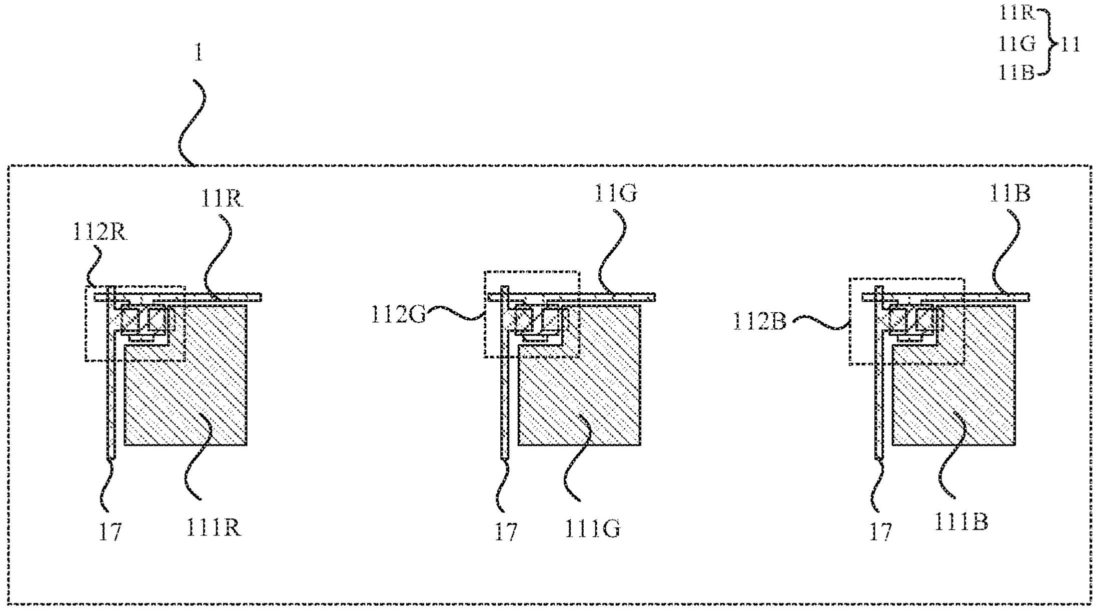
FIG. 17 is a schematic structural diagram of a first display region in a display panel according to an embodiment of the present disclosure.
Figure 18:
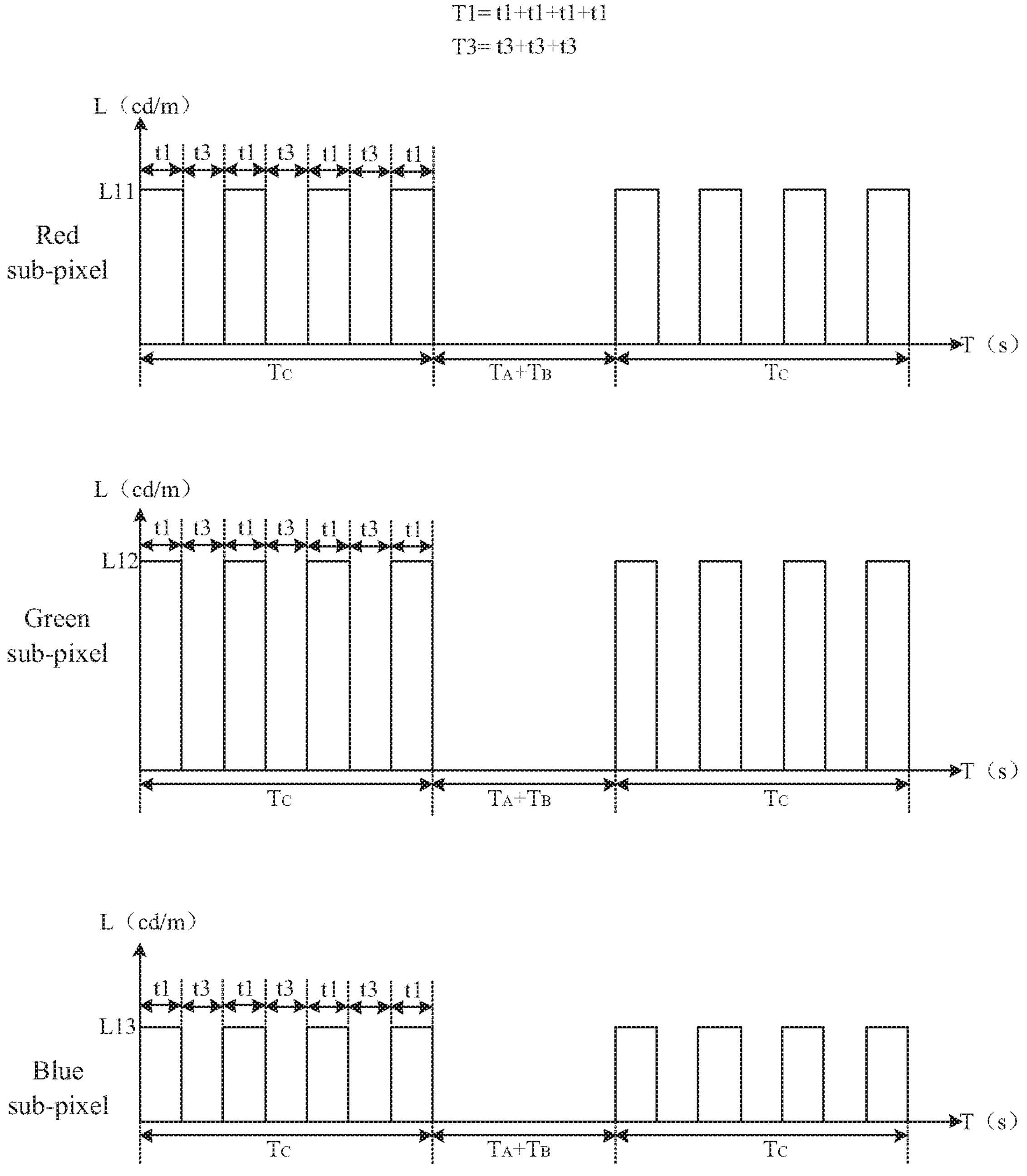
FIG. 18 is a schematic diagram of another light-emitting brightness according to an embodiment of the present disclosure.

FIG. 17 is a schematic structural diagram of a first display region in a display panel according to an embodiment of the present disclosure, and FIG. 18 is a schematic diagram of another light-emitting brightness according to an embodiment of the present disclosure. As shown in FIGS. 17 and 18, each first sub-pixel 11 includes a red sub-pixel 11R, a green sub-pixel 11G, and a blue sub-pixel 11B. During one fame of picture display, the light-emitting phase of the red sub-pixel 11R includes the first A light-emitting period T11, the light-emitting phase of the green sub-pixel 11G includes the first B light-emitting period T12, and the light-emitting phase of the blue sub-pixel 11B includes the first C light-emitting period T13. For the same target brightness, the red sub-pixel 11R emits light with the first A light-emitting brightness L11 in the first A light-emitting period T11, the green sub-pixel 11G emits light with the first B light-emitting brightness L12 in the first B light-emitting period T12, and the blue sub-pixel 11B emits light with the first C light-emitting brightness L13 in the first C light-emitting period T13, where the first A light-emitting brightness L1, the first B light-emitting brightness L12, and the first C light-emitting brightness L13 satisfy that L12>L11>L13.

Since the blue sub-pixel 11B has the lowest light-emitting efficiency, the red sub-pixel 11R has the second highest light-emitting efficiency, and the green sub-pixel 11G has the highest light-emitting efficiency, in order to ensure that the color mixing effect of the blue sub-pixel 11B, the red sub-pixel 11R, and the green sub-pixel 11G is balanced and a white light signal is obtained, it is necessary to use a relatively large driving circuit to drive the blue sub-pixel 11B to emit light, causing the service life of the blue sub-pixel 11B to be reduced. In order to ensure that the service lives of sub-pixels of different colors are the same or similar, in the embodiment of the present disclosure, for the same target brightness, the first A light-emitting brightness L11 of the red sub-pixel 11R in the first A light-emitting period T11, the first B light-emitting brightness L12 of the green sub-pixel 11G in the first B light-emitting period T12, and the first C light-emitting brightness L13 of the blue sub-pixel 11B in the first C light-emitting period T13 satisfy that L12>L11>L13, so as to ensure that the driving current signals of the red sub-pixel 11R, the green sub-pixel 11G and the blue sub-pixel 11B are the same or similar, and that service lives of the red sub-pixel 11R, the green sub-pixel 11G, and the blue sub-pixel 11B which have the same or similar driving current signals are the same or similar, and thereby the service life of the entire display panel is extended.

Figure 19:
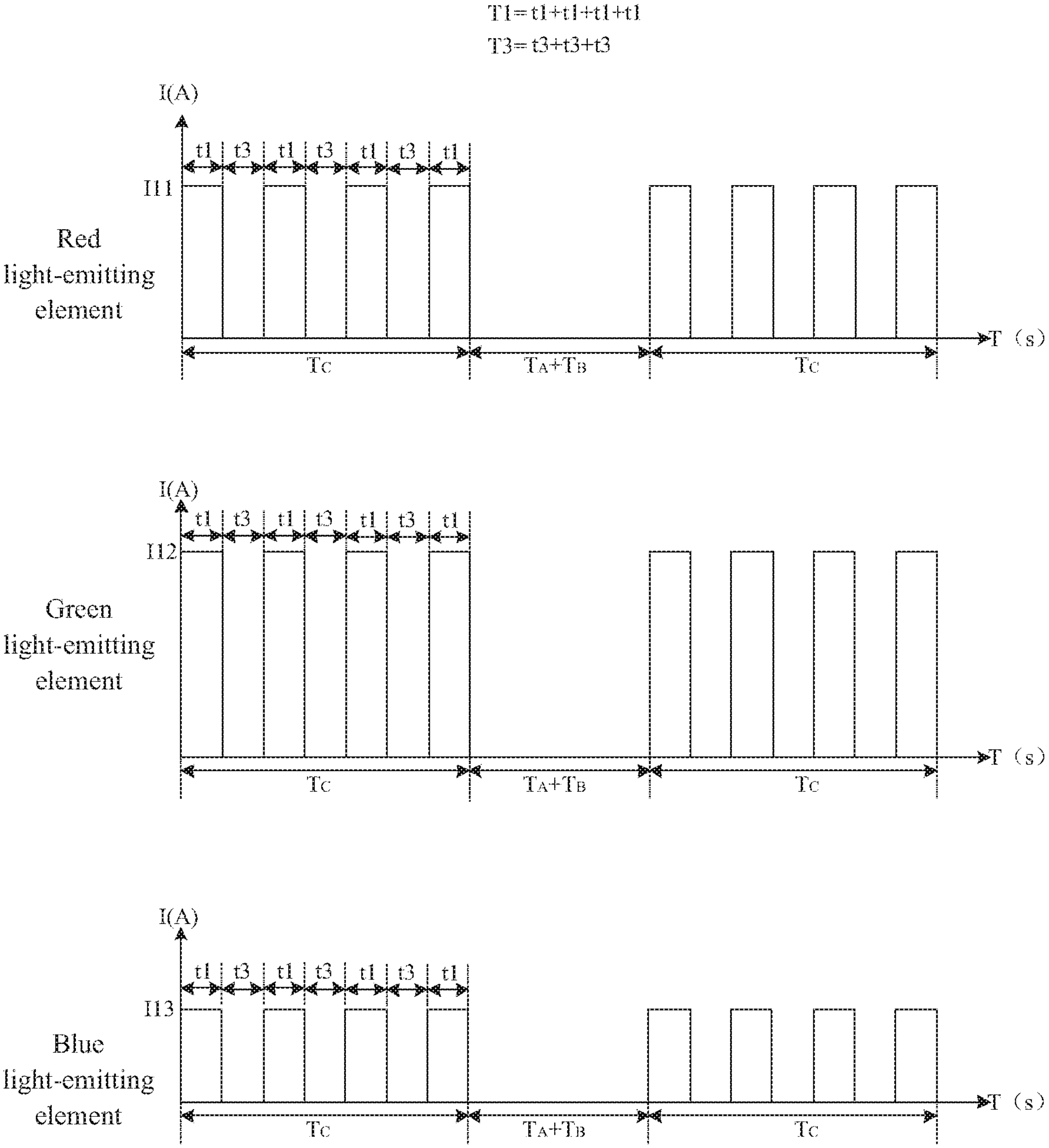
FIG. 19 is a schematic diagram of another driving current according to an embodiment of the present disclosure.

Optionally, FIG. 19 is a schematic diagram of another driving current according to an embodiment of the present disclosure. As shown in FIGS. 17 and 19, the red sub-pixel 11R includes a red light-emitting element 111R, the green sub-pixel 11G includes a green light-emitting element 111G, and the blue sub-pixel 11B includes a blue light-emitting element 111B; for the same target brightness, the red light-emitting element 111R receives the first A driving current signal I11 in the first A light-emitting period T11, the green light-emitting element 111G receives the first B driving current signal I12 in the first B light-emitting period T12, and the blue light-emitting element 111B receives the first C driving current signal I13 in the first C light-emitting period T13, where the first A driving current signal I11, the first B driving current signal I12, and the first C driving current signal I13 satisfy that I12>I11>I13.

With continued reference to FIG. 17, the red sub-pixel 11R includes a red light-emitting element 111R, the green sub-pixel 11G includes a green light-emitting element 111G, and the blue sub-pixel 11B includes a blue light-emitting element 111B. The red light-emitting element 111R, the green light-emitting element 111G, and the blue light-emitting element 111B may each be an organic light-emitting diode, and each are a light-emitting element of a current-driving type, that is, the larger the driving current, the higher the light-emitting brightness. With continued reference to FIG. 19, it can be known that the first A driving current signal 111, the first B driving current signal I12, and the first C driving current signal I13 satisfy that I12>I11>I13, ensuring that the green light-emitting element 111G has the highest light-emitting brightness in the first B light-emitting period T12, the red light-emitting element 111R has the second highest light-emitting brightness in the first A light-emitting period T11, and the blue light-emitting element 111B has the lowest light-emitting brightness in the first C light-emitting period T13, so as to ensure that the driving current signals of the red sub-pixel 11R, the green sub-pixel 11G and the blue sub-pixel 11B are the same or similar, and the service lives of the red sub-pixel 11R, the green sub-pixel 11G, and the blue sub-pixel 11B which have the same or similar driving current signals are the same or similar, and thereby the service life of the entire display panel is extended.

Optionally, the first A driving current signal I11, the first B driving current signal I12, and the first C driving current signal I13 are configured to satisfy that I12>I11>I13, many different implementations exist for such configuration, and two feasible implementations are taken as examples for description in the following.

Firstly, the case where the driving current is adjusted by adjusting the turn-on degree of the switch transistor in the pixel driving circuit is taken as an example for description.

Figure 20:
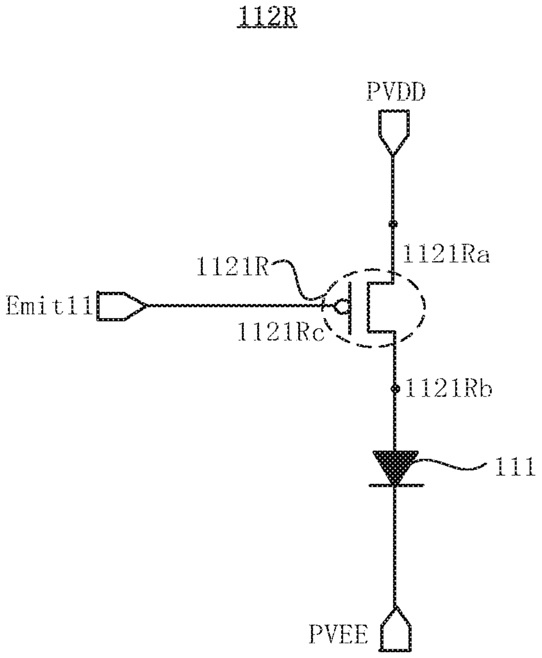
FIG. 20 is a schematic diagram of part of circuit elements of a first A pixel driving circuit according to an embodiment of the present disclosure.
Figure 21:
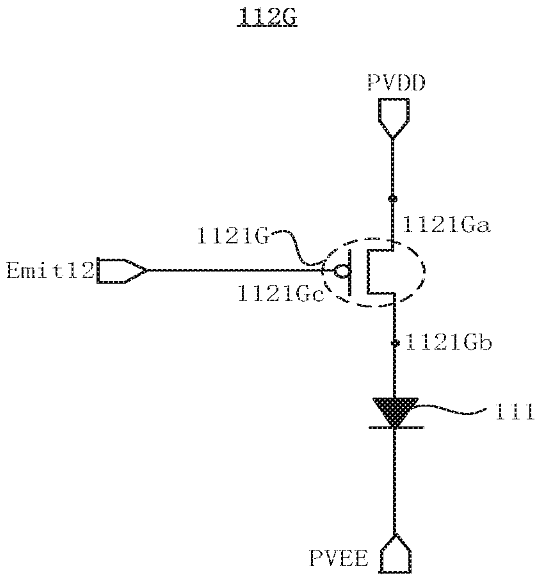
FIG. 21 is a schematic diagram of part of circuit elements of a first B pixel driving circuit according to an embodiment of the present disclosure.
Figure 22:
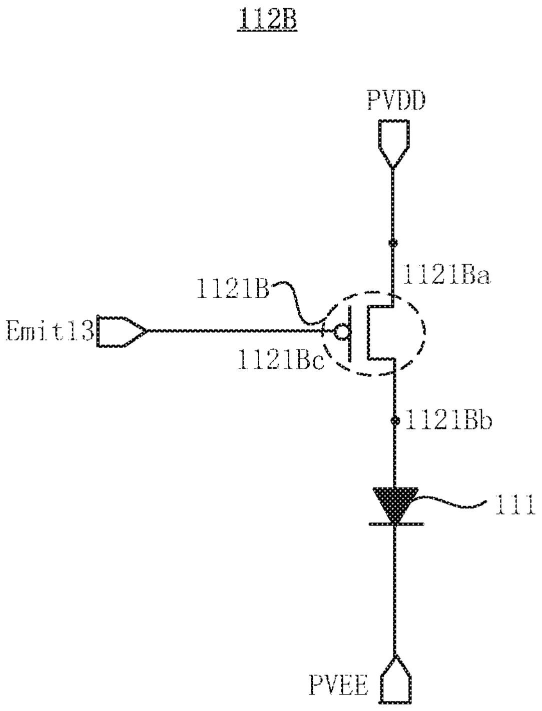
FIG. 22 is a schematic diagram of part of circuit elements of a first C pixel driving circuit according to an embodiment of the present disclosure.

Optionally, FIG. 20 is a schematic diagram of part of circuit elements of a first A pixel driving circuit according to an embodiment of the present disclosure, FIG. 21 is a schematic diagram of part of circuit elements of a first B pixel driving circuit according to an embodiment of the present disclosure, and FIG. 22 is a schematic diagram of part of circuit elements of a first C pixel driving circuit according to an embodiment of the present disclosure. With continued reference to FIGS. 17, 20, 21 and 22, the red sub-pixel 11R further includes a first A pixel driving circuit 112R including a first A switch transistor 1121R, and the first A switch transistor 1121R includes a first A input terminal 1121Ra, a first A output terminal 1121Rb, and a first A control terminal 1121Rc, where the first A input terminal 1121Ra is electrically connected to a signal source, and the first A output terminal 1121Rb is electrically connected to the red light-emitting element 111R; the green sub-pixel 11G further includes a first B pixel driving circuit 112G including a first B switch transistor 1121G, and the first C pixel driving circuit 112B includes a first B input terminal 1121Ga, a first B output terminal 1121Gb, and a first B control terminal 1121G where the first B input terminal 1121Ga is electrically connected to the signal source, and the first B output terminal 1121Gb is electrically connected to the green light-emitting element 111G; the blue sub-pixel 11B further includes a first C pixel driving circuit 112B including a first C switch transistor 1121B, and the first C switch transistor 1121B includes a first C input terminal 1121Ba, a first C output terminal 1121Bb, and a first C control terminal 1121Bc, where the first C input terminal 1121Ba is electrically connected to the signal source, and the first C output terminal 1121Bb is electrically connected to the blue light-emitting element 111B; the first A switch transistor 1121R, the first B switch transistor 1121G and the first C switch transistor 1121B are thin film transistors of the same type; in the first A light-emitting period T11, the first A switch transistor 1121R operates in the linear region, and the potential difference between the gate electrode of the first A switch transistor 1121R and the source electrode of the first A switch transistor 1121R is the first A potential difference V11; in the first B light-emitting period T12, the first B switch transistor 1121G operates in the linear region, and the potential difference between the gate electrode of the first B switch transistor 1121G and the source electrode of the first B switch transistor 1121G is the first B potential difference V12; in the first C light-emitting period T13, the first C switch transistor 1121B operates in the linear region, and the potential difference between the gate electrode of the first C switch transistor 1121B and the source electrode of the first C switch transistor 1121B is the first C potential difference V13, where for the same target brightness, the first A potential difference V11, the first B potential difference V12, and the first C potential difference V13 satisfy that |V12|>|V11|>V13|.

Exemplarily, the numbers and relative positional relationships of electronic elements in the first A pixel driving circuit 112R, the first B pixel driving circuit 112G, and the first C pixel driving circuit 112B are the same. The first A switch transistor 1121R may be M1 or M6 in the 7T1C pixel driving circuit structure described in FIG. 3, and is disposed in series between the signal source (that is, the PVDD signal) and the red light-emitting element, and FIG. 20 takes the M1 transistor in the 7T1C pixel driving circuit structure described in FIG. 3 as the first A switch transistor 1121R as an example for description. The first B switch transistor 1121G may be M1 or M6 in the 7T1C pixel driving circuit structure described in FIG. 3, and is disposed in series between the signal source (that is, the PVDD signal) and the green light-emitting element, and FIG. 21 takes the M1 transistor in the 7T1C pixel driving circuit structure described in FIG. 3 as the first B switch transistor 1121G as an example for description. The first C switch transistor 1121B may be M1 or M6 in the 7T1C pixel driving circuit structure described in FIG. 3, and is disposed in series between the signal source (that is, the PVDD signal) and the blue light-emitting element, and FIG. 22 takes the M1 transistor in the 7T1C pixel driving circuit structure described in FIG. 3 as the first C switch transistor 1121B as an example for description. In addition, the first A switch transistor 1121R, the second B switch transistor 1121G, and the first C switch transistor 1121B are thin film transistors of the same type, for example, are each a P-type thin film transistor or each are an N-type thin film transistor. FIG. 20 takes the first A switch transistor 1121R as a P-type thin film transistor as an example for description, FIG. 21 takes the first B switch transistor 1121G as a P-type thin film transistor as an example for description, and FIG. 22 takes the first C switch transistor 1121B as a P-type thin film transistor as an example for description. When the first A switch transistor 1121R is a P-type thin film transistor, the first A input terminal 1121Ra is the drain electrode of the first A switch transistor 1121R, the first A output terminal 1121Rb is the source electrode of the first A switch transistor 1121R, the first A control terminal 1121Rc is the gate electrode of the first A switch transistor 1121R, and the potential difference between the gate electrode of the first A switch transistor 1121R and the source electrode of the first A switch transistor 1121R is the potential difference between the first A control terminal 1121Rc of the first A switch transistor 1121R and the first A output terminal 1121Rb of the first A switch transistor 1121R. Similarly, when the first B switch transistor 1121G is a P-type thin film transistor, the first B input terminal 1121Ga is the drain electrode of the first B switch transistor 1121G the first B output terminal 1121Gb is the source electrode of the first B switch transistor 1121G the first B control terminal 1121Gc is the gate electrode of the first B switch transistor 1121G and the potential difference between the gate electrode of the first B switch transistor 1121G and the source electrode of the first B switch transistor 1121G is the potential difference between the first B control terminal 1121Gc of the first B switch transistor 1121G and the first B output terminal 1121Gb of the first B switch transistor 1121G Similarly, when the first C switch transistor 1121B is a P-type thin film transistor, the first C input terminal 1121Ba is the drain electrode of the first C switch transistor 1121B, the first C output terminal 1121Bb is the source electrode of the first C switch transistor 1121B, the first C control terminal 1121Bc is the gate electrode of the first C switch transistor 1121B, and the potential difference between the gate electrode of the first C switch transistor 1121B and the source electrode of the first C switch transistor 1121B is the potential difference between the first C control terminal 1121Bc of the first C switch transistor 1121B and the first C output terminal 1121Bb of the first C switch transistor 1121B.

With continued reference to FIG. 10, when the thin film transistor operates in the linear region, the greater the potential difference between the gate electrode and the source electrode, the larger the current between the drain electrode of the thin film transistor and the source electrode of the thin film transistor. Corresponding to the first A switch transistor 1121R, the greater the potential difference between the first A control terminal 1121Rc and the first A output terminal 1121Rb is, the larger the current between the first A input terminal 1121Ra and the first A output terminal 1121Rb is, the greater the turn-on degree of the first A switch transistor 1121R is, the larger the driving current received by the first A light-emitting element 111R is, and the higher the light-emitting brightness of the first A light-emitting element 111R is. Similarly, corresponding to the first B switch transistor 1121G the greater the potential difference between the first B control terminal 1121Gc and the first B output terminal 1121Gb is, the larger the current between the first B input terminal 1121Ga and the first B output terminal 1121Gb is, the greater the turn-on degree of the first B switch transistor 1121G is, the larger the driving current received by the first B light-emitting element 111G is, and the higher the light-emitting brightness of the first B light-emitting element 111G is. Similarly, corresponding to the first C switch transistor 1121B, the greater the potential difference between the first C control terminal 1121Bc and the first C output terminal 1121Bb is, the larger the current between the first C input terminal 1121Ba and the first C output terminal 1121Bb is, the greater the turn-on degree of the first C switch transistor 1121B is, the larger the driving current received by the first C light-emitting element 111B is, and the higher the light-emitting brightness of the first C light-emitting element 111B is. Therefore, in order to ensure that the service lives of the first A light-emitting element 111R, the first B light-emitting element 111G, and the first C light-emitting element 111B are the same or similar, in the embodiment of the present disclosure, for the same target brightness, the first A potential difference V11, the first B potential V12, and the first C potential V13 satisfy that |V12|>|V11|>|V13|, so as to ensure that the first B light-emitting element 111G has the highest light-emitting brightness in the first B light-emitting period T12, the first A light-emitting element 111R has the second highest light-emitting brightness in the first A light-emitting period T11, and the first C light-emitting element 111B has the lowest light-emitting brightness in the first C light-emitting period T13.

Optionally, when the first A switch transistor 1121R, the first B switch transistor 1121G, and the first C pixel driving circuit 112B are each a P-type thin film transistor, for the same target brightness, the first A potential difference V11, the first B potential difference V12, and the first C potential difference V13 satisfy that V12<V11<V13<0; and when the first A switch transistor 1121R, the first B switch transistor 1121G, and the first C pixel driving circuit 112B are each an N-type thin film transistor, for the same target brightness, the first A potential difference V11, the first B potential difference V12, and the first C potential difference V13 satisfy that V12>V11>V13>0.

Figure 23:
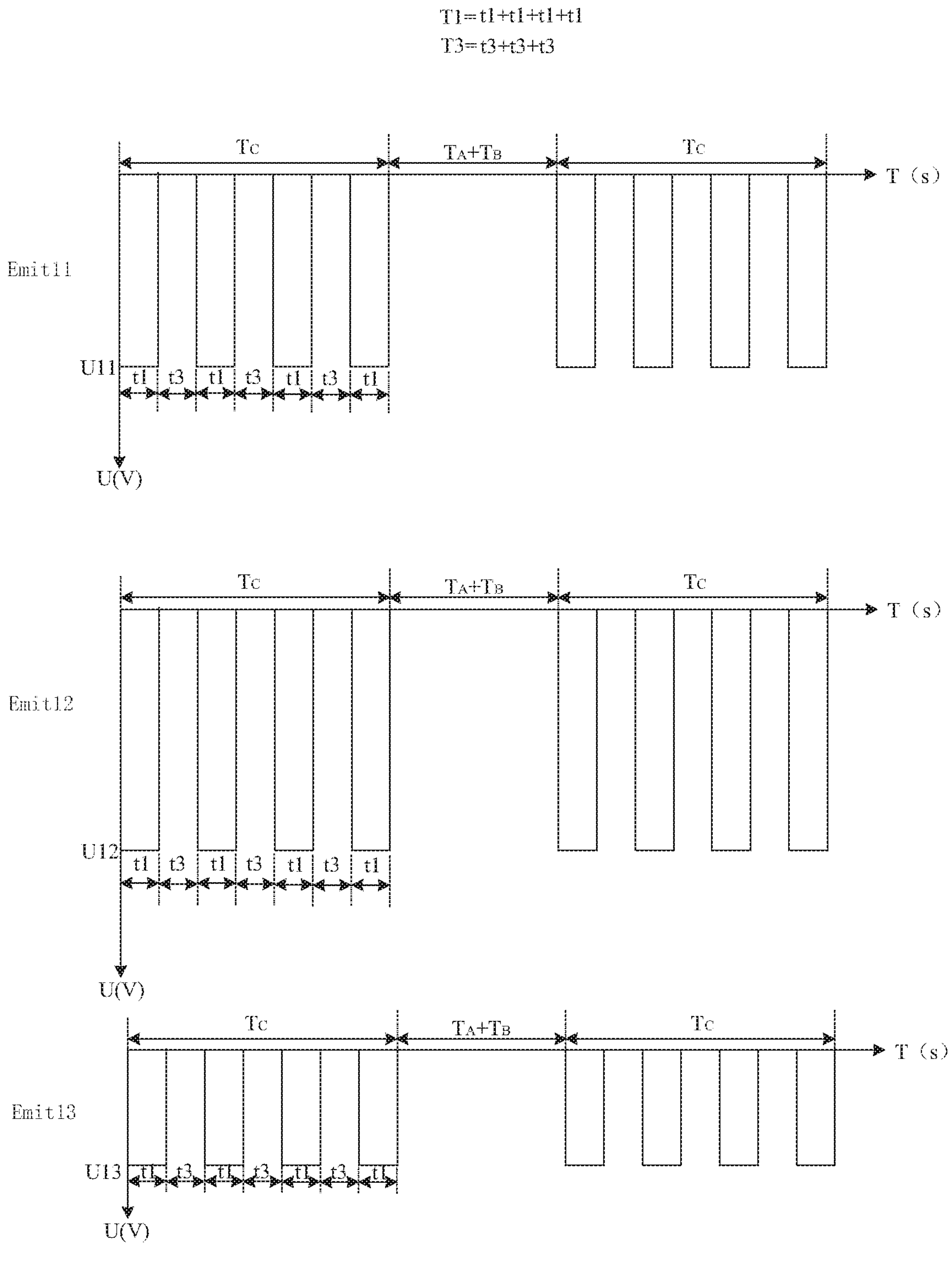
FIG. 23 is a schematic diagram of another light-emitting control signal according to an embodiment of the present disclosure.

Optionally, FIG. 23 is a schematic diagram of another light-emitting control signal according to an embodiment of the present disclosure, with continued reference to FIGS. 17, 20, 21, 22, and 23, the display panel provided in the embodiment of the present disclosure further includes a non-display region (not shown in the figure), the non-display region is provided with a first A light-emitting control circuit (not shown in the figure), a first B light-emitting control circuit (not shown in the figure), and a first C light-emitting control circuit (not shown in the figure); the first A light-emitting control circuit is configured to output a first A light-emitting control signal Emit11 to the first A control terminal 1121Rc; the first B light-emitting control circuit is configured to output a first B light-emitting control signal Emit12 to the first B control terminal 1121Gc; and the first C light-emitting control circuit is configured to output a first C light-emitting control signal Emit13 to the first C control terminal 1121Bc; in the first A light-emitting period T11, the first A light-emitting control signal Emit11 includes a first A level signal U11; in the first B light-emitting period T12, the first B light-emitting control signal Emit12 includes a first B level signal U12; and in the first C light-emitting period T13, the first C light-emitting control signal Emit13 includes a first C level signal U13; where |U12|>|U11|>|U13|.

Exemplarily, the first A switch transistor 1121R, the first B switch transistor 1121G and the first C switch transistor 1121B are thin film transistors of the same type, and the first A pixel driving circuit 112R, the first B pixel driving circuit 112G and the first C pixel driving circuit 112B have the same number of electronic elements, the same relative positional relationship of electronic elements, and the same other control signals received except that the received light-emitting control signals are different, therefore, the potential of the first A output terminal 1121Rb of the first A switch transistor 1121R, the potential of the first B output terminal 1221Gb of the first B switch transistor 1121G, and the potential of the first C output terminal 1221Bb of the first C switch transistor 1121B are the same. Moreover, the potential of the first A control terminal 1121Rc is the potential of the first A light-emitting control signal Emit11, the potential of the first B control terminal 1121Gc is the potential of the first B light-emitting control signal Emit2, and the potential of the first C control terminal 1121Bc is the potential of the first C light-emitting control signal Emit13. Therefore, in the embodiment of the present disclosure, the first A level signal U11 of the first A light-emitting control signal Emit11 in the first A light-emitting period T11, the first B level signal U12 of the first B light-emitting control signal Emit12 in the first B light-emitting period T12, and the first C level signal U13 of the first C light-emitting control signal Emit13 in the first C light-emitting period T13 satisfy that |U12|<|U11|<|U13|, thereby ensuring that for the same target brightness, the first A potential difference V11 between the first A control terminal 1121Rc of the first A switch transistor 1121R and the first A output terminal 1121Rb of the first A switch transistor 1121R, the first B potential difference V12 between the first B control terminal 1121Gc of the first B switch transistor 1121G and the first B output terminal 1121Rb of the first B switch transistor 1121; and the first C potential difference V13 between the first C control terminal 1121Bc of the first C switch transistor 1121B and the first C output terminal 1121Bb of the first C switch transistor 1121B satisfy that |V12|>|V11|>|V13|, ensuring that the first B light-emitting element 111G has the highest light-emitting brightness in the first B light-emitting period T12, the first A light-emitting element 111R has the second highest light-emitting brightness in the first A light-emitting period T11, and the first C light-emitting element 111B has the lowest light-emitting brightness in the first C light-emitting period T13, ensuring that the service lives of the first A light-emitting element 111R, the first B light-emitting element 111G, and the first C light-emitting element 111B are the same or similar, and then a longer service life of the overall display panel is ensured.

Optionally, when the first A switch transistor 1121R, the first B switch transistor 1121G, and the first C pixel driving circuit 112B are each a P-type thin film transistor, for the same target brightness, the first A level signal U11, the first B level signal U12, and the first C level signal U13 satisfy that U12<U11<U13<0; and when the first A switch transistor 1121R, the first B switch transistor 1121G, and the first C pixel driving circuit 112B are each an N-type thin film transistor, for the same target brightness, the first A level signal U11, the first B level signal U12, and the first C level signal U13 satisfy that U12>U11>U13>0.

The above has described the case where the driving current is adjusted by adjusting the turn-on degrees of the switch transistors (the first A switch transistor, the first B switch transistor, and the first C switch transistor) in the pixel driving circuits (the first A pixel driving circuit, the first B pixel driving circuit, and the first C pixel driving circuit). It can be known from the above description that when the switch transistor operates in the linear region, the light-emitting brightness of the light-emitting element can be ensured by adjusting the magnitude of the light-emitting control signal, so that the service life of the light-emitting element is further ensured, and the service life of the overall display panel is extended.

Next, the case where the driving current is adjusted by adjusting the data voltage signal received by the light-emitting element is taken as an example for description.

Figure 24:
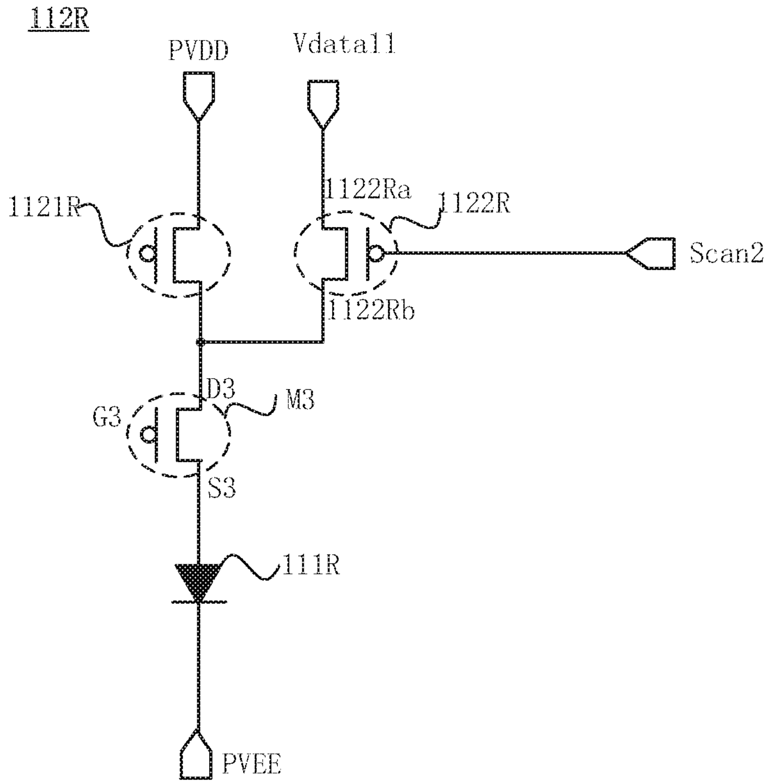
FIG. 24 is a schematic diagram of part of circuit elements of a first A pixel driving circuit according to an embodiment of the present disclosure.
Figure 25:
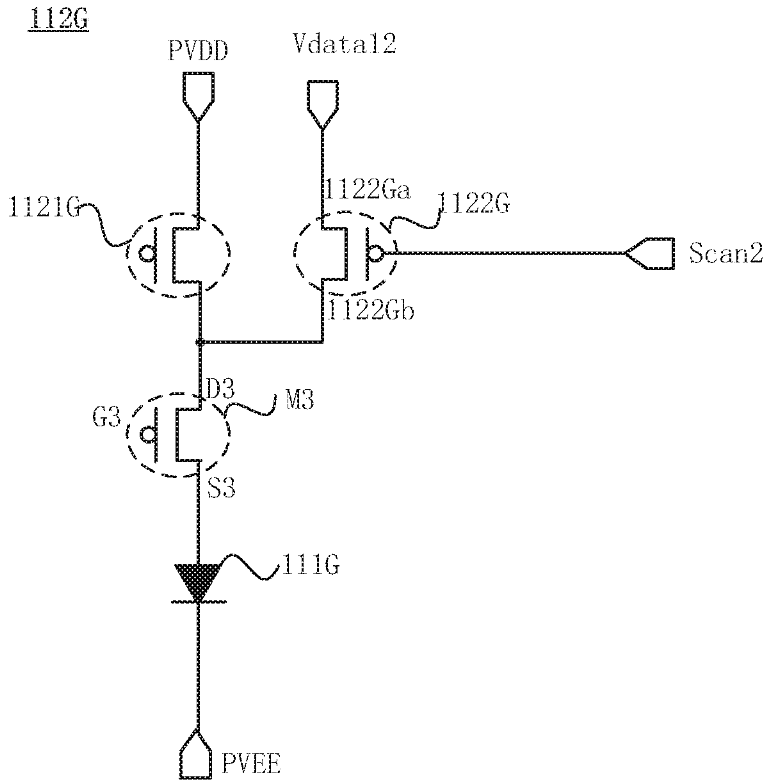
FIG. 25 is a schematic diagram of part of circuit elements of a first B pixel driving circuit according to an embodiment of the present disclosure.
Figure 26:
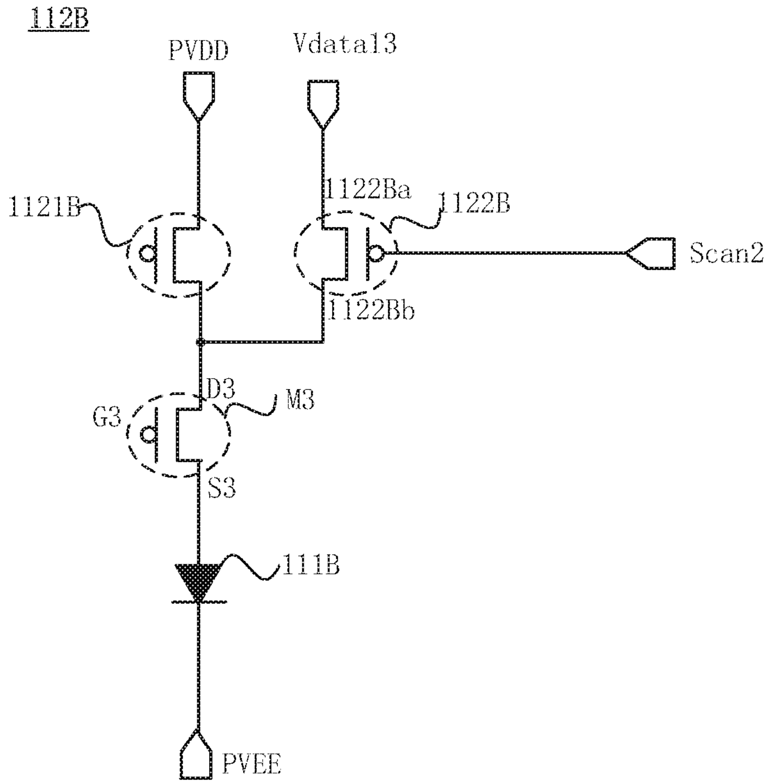
FIG. 26 is a schematic diagram of part of circuit elements of a first C pixel driving circuit according to an embodiment of the present disclosure.
Figure 27:
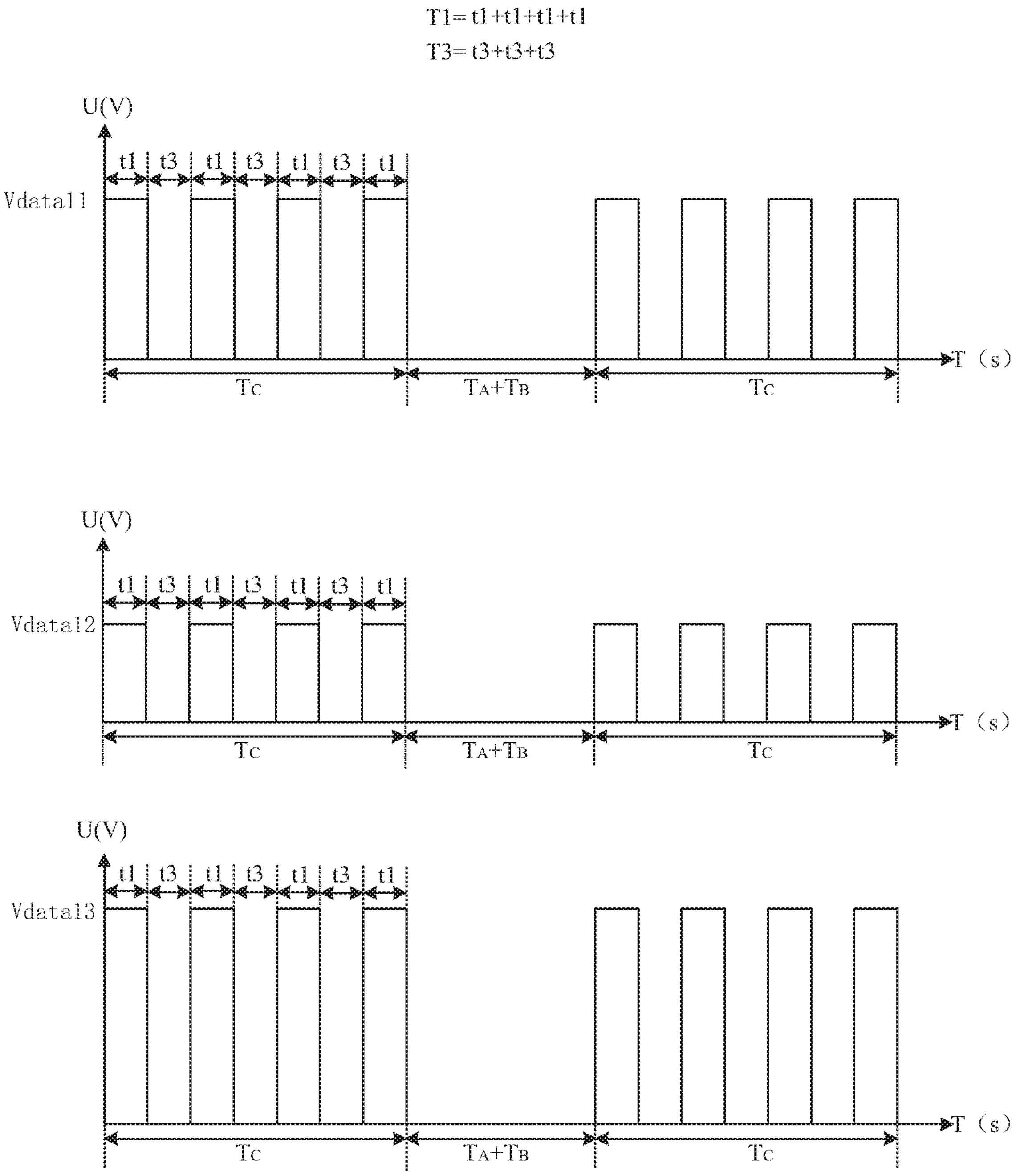
FIG. 27 is a schematic diagram of another data voltage signal according to an embodiment of the present disclosure.

FIG. 24 is a schematic diagram of part of circuit elements of a first A pixel driving circuit according to an embodiment of the present disclosure, FIG. 25 is a schematic diagram of part of circuit elements of a first B pixel driving circuit according to an embodiment of the present disclosure, FIG. 26 is a schematic diagram of part of circuit elements of a first C pixel driving circuit according to an embodiment of the present disclosure, and FIG. 27 is a schematic diagram of another data voltage signal according to an embodiment of the present disclosure. With reference to FIGS. 4, 17, 24, 25, 26, and 27, the red sub-pixel 11R further includes a first A pixel driving circuit 112R including a first A switch transistor 1121R; the green sub-pixel 11G further includes a first B pixel driving circuit 112G including a first B switch transistor 1121G; and the blue sub-pixel 11B further includes a first C pixel driving circuit 112B including a first C switch transistor 1121B, where the first A switch transistor 1121R, the first B switch transistor 1121G, and the first C switch transistor 1121B are thin film transistors of the same type, and the first A switch transistor 1121R, the first B switch transistor 1121G and the first C switch transistor 1121B all operate in the saturation region; the display panel further includes a plurality of data lines 17; the first A pixel driving circuit 112R further includes a first A data writing transistor 1122R including a third A input terminal 1122Ra and a third A output terminal 1122Rb, where the third A input terminal 1122Ra is electrically connected to the data line 17, and the third A output terminal 1122Rb is electrically connected to the red light-emitting element 111R; the first B pixel driving circuit 112G further includes a first B data writing transistor 1122G including a third B input terminal 1122Ga and a third B output terminal 1122Gb, where the third B input terminal 1122Ga is electrically connected to the data line 17, and the third B output terminal 1122Gb is electrically connected to the red light-emitting element 111G; and the first C pixel driving circuit 112B further includes a first C data writing transistor 1122B including a third C input terminal 1122Ba and a third C output terminal 1122Bb, where the third C input terminal 1122Ba is electrically connected to the data line 17, and the third C output terminal 1122Bb is electrically connected to the red light-emitting element 111B; the first A data writing transistor 1122R, the first B data writing transistor 1122G, and the first C data writing transistor 1122B are thin film transistors of the same type; in the first A light-emitting period T11, the third A input terminal 1122Ra is used for receiving the first A data voltage signal Vdata11 provided by the data line 17, and the potential difference between the signal source voltage signal Pvdd and the first A data voltage signal Vdata11 is the fourth A potential difference V41; in the first B light-emitting period T12, the third B input terminal 1122Ga is used for receiving the first B data voltage signal Vdata12 provided by the data line 17, and the potential difference between the signal source voltage signal Pvdd and the first B data voltage signal Vdata12 is the fourth B potential difference V42; and in the first C light-emitting period T13, the third C input terminal 1122Ba is used for receiving the first C data voltage signal Vdata13 provided by the data line 17, and the potential difference between the signal source voltage signal Pvdd and the first C data voltage signal Vdata13 is the fourth C potential difference V43; for the same target brightness, the fourth A potential difference V41, the fourth B potential difference V42, and the fourth C potential difference V43 satisfy that |V42|>|V41|>|V43|.

Exemplarily, the numbers and relative positional relationships of electronic elements in the first A pixel driving circuit 112R, the first B pixel driving circuit 112G, and the first C pixel driving circuit 112B are the same. The first A switch transistor 1121R may be M1 or M6 in the 7T1C pixel driving circuit structure described in FIG. 3 and is disposed in series between the signal source (that is, the PVDD signal) and the red light-emitting element, and the first A data writing transistor 1122R may be M2 in the 7T1C pixel driving circuit structure described in FIG. 3 for receiving the first A data voltage signal. The first B switch transistor 1121G may be M1 or M6 in the 7T1C pixel driving circuit structure described in FIG. 3 and is disposed in series between the signal source (that is, the PVDD signal) and the green light-emitting element, and the first B data writing transistor 1122G may be M2 in the 7T1C pixel driving circuit structure described in FIG. 3 for receiving the first B data voltage signal. The first C switch transistor 1121B may be M1 or M6 in the 7T1C pixel driving circuit structure described in FIG. 3 and is disposed in series between the signal source (that is, the PVDD signal) and the blue light-emitting element, and the first C data writing transistor 1122B may be M2 in the 7T1C pixel driving circuit structure described in FIG. 3 for receiving the first C data voltage signal. In addition, the first A switch transistor 1121R, the first B switch transistor 1121G, and the first C switch transistor 1121B are thin film transistors of the same type, for example, are each a P-type thin film transistor or are each an N-type thin film transistor, and the first A data writing transistor 1122R, the first B data writing transistor 1122G, and the first C data writing transistor 1122B are thin film transistors of the same type, for example, are each a P-type thin film transistor or are each an N-type thin film transistor. FIG. 24 takes the first A switch transistor 1121R and the first A data writing transistor 1122R both as P-type thin film transistors as an example for description, FIG. 25 takes the first B switch transistor 1121G and the first B data writing transistor 1122G both as P-type thin film transistors as an example for description, and FIG. 26 takes the first C switch transistor 1121B and the first C data writing transistor 1122B both as P-type thin film transistors as an example for description. When the first A data writing transistor 1122R is the P-type thin film transistor, the third A input terminal 1122Ra is the drain electrode of the first A data writing transistor 1122R, and the third A output terminal 1122Rb is the source electrode of the first A data writing transistor 1122R. Similarly, when the first B data writing transistor 1122G is the P-type thin film transistor, the third B input terminal 1122Ga is the drain electrode of the first B data writing transistor 1122G, and the third B output terminal 1122Gb is the source electrode of the first B data writing transistor 1122G. Similarly, when the first C data writing transistor 1122B is the P-type thin film transistor, the third C input terminal 1122Ba is the drain electrode of the first C data writing transistor 1122B, and the third C output terminal 1122Bb is the source electrode of the first C data writing transistor 1122B.

It can be known from the schematic diagram of an operating curve of the thin film transistor shown in FIG. 10 that when the thin film transistor is in the saturation region, the current between the source electrode and drain electrode of the thin film transistor does not change much with a continued increase in the potential difference between the gate electrode and source electrode of the thin film transistor. Therefore, when the first A switch transistor 1121R, the first B switch transistor 1121G, and the first C switch transistor 1121B operate in the saturation region, it is difficult to continue adjusting the light-emitting brightness of the first A light-emitting element 111R, the first B light-emitting element 111G, and the first C light-emitting element 111B via the light-emitting control signal.

It can be known from the operating principle of the pixel driving circuit that the leakage current $I_d$ of the driving transistor M3 satisfies the following formula:

$$I_d = \frac{1}{2}\mu C_{ox}\frac{W}{L}(V_{sg} - |V_{th}|)^2 = \frac{1}{2}\mu C_{ox}\frac{W}{L}(V_{PVDD} - V_{data} + |V_{th}| - |V_{th}|)^2 = \frac{1}{2}\mu C_{ox}\frac{W}{L}(V_{PVDD} - V_{data})^2.$$

It can be known from the above formula that increasing the signal source voltage signal Pvdd received by the driving transistor M3 or decreasing the data voltage signal Vdata can increase the leakage current of the driving transistor M3, thereby adjusting the light-emitting brightness of the light-emitting element. Since the signal source voltage signal Pvdd is provided by the signal line provided on the entire surface, the signal source voltage signal Pvdd received by the circuit in different pixel regions is the same. Therefore, the light-emitting brightness of the light-emitting element can be adjusted by adjusting the data voltage signals Vdata received by different pixel driving circuits.

Based on the above-mentioned principle for analysis, and with continued reference to the schematic diagram of the data voltage signal provided in FIG. 27, it can be known that in the embodiment of the present disclosure, the first A data voltage signal Vdata11 received by the third A input terminal 1122Ra in the first A light-emitting period T11, the first B data voltage signal Vdata12 received by the third B input terminal 1122Ga in the first B light-emitting period T12, and the first C data voltage signal Vdata13 received by the first C input terminal 1122Ba in the first C light-emitting period T13 satisfy that Vdata12<Vdata11<Vdata13, ensuring that the fourth A potential difference V41 between the signal source voltage signal Pvdd and the first A data voltage signal Vdata11, the fourth B potential difference V42 between the signal source voltage signal Pvdd and the first B data voltage signal Vdata12, and the fourth C potential difference V43 between the signal source voltage signal Pvdd and the first C data voltage signal Vdata13 satisfy that |V42|>|V41|>|V43|, ensuring that the first A driving current I11 received by the first A light-emitting element 111R in the first A light-emitting period T11, the first B driving current I12 received by the first B light-emitting element 111G in the first B light-emitting period T12, and the first C driving current I13 received by the first C light-emitting element 111B in the first C light-emitting period T13 satisfy that I12>I11>I13, ensuring that the first B light-emitting element 111G has the highest light-emitting brightness in the first B light-emitting period T12, the first A light-emitting element 111R has the second highest light-emitting brightness in the first A light-emitting period T11, and the first C light-emitting element 111B has the lowest light-emitting brightness in the first C period T13, ensuring that the service lives of the first A light-emitting element 111R, the first B light-emitting element 111G, and the first C light-emitting element 111B are the same or similar, and thereby a longer service life of the overall display panel is ensured.

The above has described the case where the driving current is adjusted by adjusting the data voltage signals received by the data writing transistors (the first A data writing transistor, the first B data writing transistor, and the first C data writing transistor) in the pixel driving circuits (the first A pixel driving circuit, the first B pixel driving circuit, and the first C pixel driving circuit). It can be known from the above description that when the switch transistor operates in the saturation region, the light-emitting brightness of the light-emitting element can be ensured by adjusting the data voltage signal received by the data writing transistor, so that the service life of the light-emitting element is further adjusted, and the service life of the overall display panel is extended.

In summary, the case where the driving current is adjusted by adjusting the turn-on degree of the switch transistor in the pixel driving circuit, and the case where the driving current is adjusted by adjusting the data voltage signal received by the data writing transistor in the pixel driving circuit used to achieve different light-emitting brightness of different light-emitting elements have been described in detail. It can be known from the above description that the service lives of sub-pixels located in different display regions can be adjusted by adjusting the light-emitting brightness of different light-emitting elements, and the service life of the entire display panel can be extended.

Figure 28:
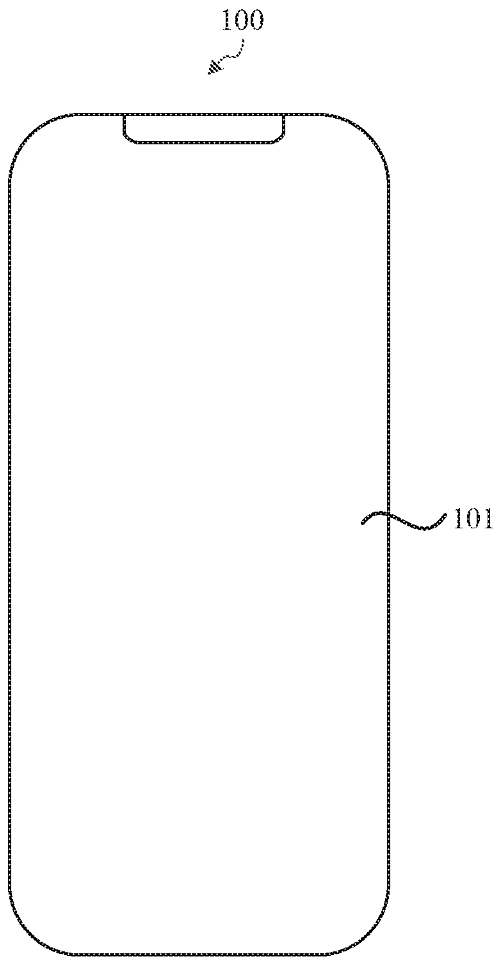
FIG. 28 is a schematic structural diagram of a display device according to an embodiment of the present disclosure.

On the basis of the above embodiments, the embodiment of the present disclosure further provides a display device, the display device includes the display panel of any one of the embodiments of the present disclosure. Specifically, FIG. 28 is a structural diagram of a display device according to an embodiment of the present disclosure. With reference to FIG. 28, the display device 100 includes a display panel 101 according to the above-mentioned embodiments. Exemplarily, the display device 100 may be a mobile phone, a computer, a smart wearable device (such as a smart watch), an onboard display device, and other electronic devices and no limitations are made thereto in the embodiments of the present disclosure.

It is to be noted that the above are merely preferred embodiments of the present disclosure and the technical principles used therein. It will be understood by those skilled in the art that the present disclosure is not limited to the specific embodiments described herein, and that the features of the various embodiments of the present disclosure may be coupled or combined in part or in whole with each other, and may be collaborated with each other and technically driven in various ways. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may further include more other equivalent embodiments without departing from the concept of the present disclosure. The scope of the present disclosure is determined by the scope of the appended claims.

What is claimed is:

1. A display panel, comprising a first display region and a second display region, wherein the first display region is reused as a sensor setting region;

wherein the first display region comprises a plurality of first sub-pixels which are provided with first pixel density; wherein the second display region comprises a plurality of second sub-pixels which are provided with second pixel density; wherein the first pixel density is lower than the second pixel density;

wherein in duration of one frame of display picture, a light-emitting phase of the plurality of first sub-pixels comprises a first light-emitting period, and a light-emitting phase of the plurality of second sub-pixels comprises a second light-emitting period; wherein for same target brightness, the plurality of first sub-pixels is configured to emit light with first light-emitting brightness during the first light-emitting period, and the plurality of second sub-pixels is configured to emit light with second light-emitting brightness during the second light-emitting period; and wherein the first light-emitting brightness L1 and the second light-emitting brightness L2 satisfy that L1>L2, and the first light-emitting period T1 and the second light-emitting period T2 satisfy that T1<T2.

2. The display panel of claim 1, wherein the light-emitting phase of the plurality of first sub-pixels further comprises a third period, and the plurality of first sub-pixels emits light with third light-emitting brightness during the third period; and wherein the third light-emitting brightness L3 and the second light-emitting brightness L2 satisfy that L3<L2, and the first light-emitting period T1, the second light-emitting period T2, and the third period T3 satisfy that T1+T3=T2.

3. The display panel of claim 2, wherein the first light-emitting period comprises a plurality of first light-emitting sub-periods, and the third period comprises a plurality of third sub-periods; and wherein in the light-emitting phase of the plurality of first sub-pixels, the plurality of first light-emitting sub-periods and the plurality of third sub-periods alternate in a manner of one first light-emitting sub-period followed by one third sub-period.

4. The display panel of claim 3, wherein each of the plurality of third sub-periods t3 satisfies that 5 ms≤t3≤15 ms.

5. The display panel of claim 2, wherein each of the plurality of first sub-pixels comprises a first light-emitting element, and each of the plurality of second sub-pixels comprises a second light-emitting element;

wherein for the same target brightness, the first light-emitting element is configured to receive a first driving current signal during the first light-emitting period, and the second light-emitting element is configured to receive a second driving current signal during the second light-emitting period; and the first light-emitting element is configured to receive a third driving current signal during the third period; and wherein the first driving current signal I1, the second driving current signal I2, and the third driving current signal I3 satisfy that I1>I2>I3.

6. The display panel of claim 5, wherein the each of the plurality of first sub-pixels further comprises a first pixel driving circuit including a first switch transistor, the first switch transistor comprises a first input terminal, a first output terminal, and a first control terminal, wherein the first input terminal is electrically connected to a signal source, and the first output terminal is electrically connected to the first light-emitting element; wherein the each of the plurality of second sub-pixels further comprises a second pixel driving circuit including a second switch transistor, the second switch transistor comprises a second input terminal, a second output terminal and a second control terminal, wherein the second input terminal is electrically connected to the signal source, and the second output terminal is electrically connected to the second light-emitting element; and wherein the first switch transistor and the second switch transistor are thin film transistors of a same type;

wherein in the first light-emitting period, the first switch transistor is configured to operate in a linear region, and a potential difference between a gate electrode of the first switch transistor and a source electrode of the first switch transistor is a first potential difference; wherein in the second light-emitting period, the second switch transistor is configured to operate in the linear region, and a potential difference between a gate electrode of the second switch transistor and a source electrode of the second switch transistor is a second potential difference; wherein in the third period, the first switch transistor is configured to operate in the linear region, and the potential difference between the gate electrode of the first switch transistor and the source electrode of the first switch transistor is a third potential difference; and wherein for the same target brightness, the first potential difference V1, the second potential difference V2, and the third potential difference V3 satisfy that $|V1|>|V2|>|V3|$.

7. The display panel of claim 6, further comprising a non-display region, the non-display region is provided with a first light-emitting control circuit and a second light-emitting control circuit, wherein the first light-emitting control circuit is configured to output a first light-emitting control signal to the first control terminal, and the second light-emitting control circuit is configured to output a second light-emitting control signal to the second control terminal; and wherein in the first light-emitting period, the first light-emitting control signal comprises a first level signal U1; wherein in the second light-emitting period, the second light-emitting control signal comprises a second level signal U2; and wherein in the third period, the first light-emitting control signal comprises a third level signal U3; and wherein $|U3|<|U2|<|U1|$.

8. The display panel of claim 6, wherein in the third period, in response to determining that the first switch transistor operates in the linear region, the third potential difference V3 between the gate electrode of the first switch transistor and the source electrode of the first switch transistor satisfies that $|V3|>|Vth|$, wherein Vth is a threshold voltage of the first switch transistor; and wherein the third light-emitting brightness L3 satisfies that $L3>0$; and wherein in the third period, in response to determining that the first switch transistor operates in a cut-off region, the third potential difference V3 between the first control terminal and the first input terminal satisfies that $|V3|\leq|Vth|$; and wherein the third light-emitting brightness L3 satisfies that $L3=0$.

9. The display panel of claim 5, wherein the each of the plurality of first sub-pixels further comprises a first pixel driving circuit including a first switch transistor; wherein the each of the plurality of second sub-pixels further comprises a second pixel driving circuit including a second switch transistor; and wherein the first switch transistor and the second switch transistor are thin film transistors of a same type and configured to operate in a saturation region;

wherein the display panel further comprises a plurality of data lines;

wherein the first pixel driving circuit further comprises a first data writing transistor including a third input terminal and a third output terminal, wherein the third input terminal is electrically connected to a corresponding data line of the plurality of data lines, and the third output terminal is electrically connected to the first light-emitting element; wherein the second pixel driving circuit further comprises a second data writing transistor including a fourth input terminal and a fourth output terminal, wherein the fourth input terminal is electrically connected to a corresponding data line of the plurality of data lines, and the fourth output terminal is electrically connected to the second light-emitting element; and wherein the first data writing transistor and the second data writing transistor are thin film transistors of a same type;

wherein in the first light-emitting period, the third input terminal is configured to receive a first data voltage signal provided by the corresponding data line of the third input terminal, and a potential difference between a signal source voltage signal and the first data voltage signal is a fourth potential difference; wherein in the second light-emitting period, the fourth input terminal is configured to receive a second data voltage signal provided by the corresponding data line of the fourth input terminal, and a potential difference between the signal source voltage signal and the second data voltage signal is a fifth potential difference; and wherein in the third period, the third input terminal is configured to receive a third data voltage signal provided by the corresponding data line of the third input terminal, and a potential difference between the signal source voltage signal and the third data voltage signal is a sixth potential difference; and wherein for the same target brightness, the fourth potential difference V4, the fifth potential difference V5, and the sixth potential difference V6 satisfy that $|V4|>|V5|>|V6|$.

10. The display panel of claim 1, wherein the each of the plurality of first sub-pixels comprises a red sub-pixel, a green sub-pixel, and a blue sub-pixel;

wherein in the duration of the one frame of display picture, a light-emitting phase of the red sub-pixel comprises a first A light-emitting period, a light-emitting phase of the green sub-pixel comprises a first B light-emitting period, and a light-emitting phase of the blue sub-pixel comprises a first C light-emitting period;

wherein for the same target brightness, the red sub-pixel is configured to emit light with first A light-emitting brightness during the first A light-emitting period, the green sub-pixel is configured to emit light with first B light-emitting brightness during the first B light-emitting period, and the blue sub-pixel is configured to emit light with first C light-emitting brightness during the first C light-emitting period; and wherein the first A light-emitting brightness L11, the first B light-emitting brightness L12, and the first C light-emitting brightness L13 satisfy that $L12>L11>L13$.

11. The display panel of claim 10, wherein the red sub-pixel comprises a red light-emitting element, the green sub-pixel comprises a green light-emitting element, and the blue sub-pixel comprises a blue light-emitting element;

wherein for the same target brightness, the red light-emitting element receives a first A driving current signal during the first A light-emitting period, the green light-emitting element receives a first B driving current signal during the first B light-emitting period, and the blue light-emitting element receives a first C driving current signal during the first C light-emitting period; and wherein the first A driving current signal I11, the first B driving current signal I12, and the first C driving current signal I13 satisfy that $I12>I11>I13$.

12. The display panel of claim 11, wherein the red sub-pixel further comprises a first A pixel driving circuit including a first A switch transistor, the first A switch transistor comprises a first A input terminal, a first A output terminal, and a first A control terminal, wherein the first A input terminal is electrically connected to a signal source, and the first A output terminal is electrically connected to the red light-emitting element; wherein the green sub-pixel further comprises a first B pixel driving circuit including a first B switch transistor, the first B switch transistor comprises a first B input terminal, a first B output terminal and a first B control terminal, wherein the first B input terminal is electrically connected to the signal source, and the first B output terminal is electrically connected to the green light-emitting element; wherein the blue sub-pixel further comprises a first C pixel driving circuit including a first C switch transistor, the first C switch transistor comprises a first C input terminal, a first C output terminal and a first C control terminal, wherein the first C input terminal is electrically connected to the signal source, and the first C output terminal is electrically connected to the blue light-emitting element; and wherein the first A switch transistor, the first B switch transistor, and the first C switch transistor are thin film transistors of a same type;

wherein in the first A light-emitting period, the first A switch transistor is configured to operate in a linear region, and a potential difference between a gate electrode of the first A switch transistor and a source electrode of the first A switch transistor is a first A potential difference; wherein in the first B light-emitting period, the first B switch transistor is configured to operate in the linear region, and a potential difference between a gate electrode of the first B switch transistor and a source electrode of the first B switch transistor is a first B potential difference; and wherein in the first C light-emitting period, the first C switch transistor is configured to operate in the linear region, and a potential difference between a gate electrode of the first C switch transistor and a source electrode of the first C switch transistor is a first C potential difference; and wherein for the same target brightness, the first A potential difference V11, the first B potential difference V12, and the first C potential difference V13 satisfy that $|V12|>|V11|>|V13|$.

13. The display panel of claim 12, further comprising a non-display region, the non-display region is provided with a first A light-emitting control circuit, a first B light-emitting control circuit, and a first C light-emitting control circuit, wherein the first A light-emitting control circuit is configured to output a first A light-emitting control signal to the first A control terminal, the first B light-emitting control circuit is configured to output a first B light-emitting control signal to the first B control terminal, and the first C light-emitting control circuit is configured to output a first C light-omitting control signal to the first C control terminal; and wherein in the first A light-emitting period, the first A light-emitting control signal comprises a first A level signal U11; wherein in the first B light-emitting period, the first B light-emitting control signal comprises a first B level signal U12; and wherein in the first C period, the first C light-emitting control signal comprises a first C level signal U13; wherein $|U12|>|U11|>|U13|$.

14. The display panel of claim 11, wherein the red sub-pixel further comprises a first A pixel driving circuit, and the first A pixel driving circuit comprises a first A switch transistor; wherein the green sub-pixel further comprises a first B pixel driving circuit, and the first B pixel driving circuit comprises a first B switch transistor; and wherein the blue sub-pixel further comprises a first C pixel driving circuit, and the first C pixel driving circuit comprises a first C switch transistor; wherein the first A switch transistor, the first B switch transistor, and the first C switch transistor are thin film transistors of a same type, and are each configured to operate in a saturation region;

wherein the display panel further comprises a plurality of data lines;

wherein the first A pixel driving circuit further comprises a first A data writing transistor including a third A input terminal and a third A output terminal, wherein the third A input terminal is electrically connected to a corresponding data line of the plurality of data lines, and the third A output terminal is electrically connected to the red light-emitting element; wherein the first B pixel driving circuit further comprises a first B data writing transistor including a third B input terminal and a third B output terminal, wherein the third B input terminal is electrically connected to a corresponding data line of the plurality of data lines, and the third B output terminal is electrically connected to the green light-emitting element; and wherein the first C pixel driving circuit further comprises a first C data writing transistor including a third C input terminal and a third C output terminal, wherein the third C input terminal is electrically connected to a corresponding data line of the plurality of data lines, and the third C output terminal is electrically connected to the blue light-emitting element; wherein the first A data writing transistor, the first B data writing transistor, and the first C data writing transistor are thin film transistors of a same type;

wherein in the first A light-emitting period, the third A input terminal is configured to receive a first A data voltage signal provided by the corresponding data line of the third A input terminal, and a potential difference between a signal source voltage signal and the first A data voltage signal is a fourth A potential difference; wherein in the first B light-emitting period, the third B input terminal is configured to receive a first B data voltage signal provided by the corresponding data line of the third B input terminal, and a potential difference between the signal source voltage signal and the first B data voltage signal is a fourth B potential difference; and wherein in the first C light-emitting period, the third C input terminal is configured to receive a first C data voltage signal provided by the corresponding data line of the third C input terminal, and a potential difference between the signal source voltage signal and the first C data voltage signal is a fourth C potential difference; and wherein for the same target brightness, the fourth A potential difference V41, the fourth B potential difference V42, and the fourth C potential difference V43 satisfy that $|V42|>|V41|>|V43|$.

15. The display panel of claim 7, wherein in the third period, in response to determining that the first switch transistor operates in the linear region, the third potential difference V3 between the gate electrode of the first switch transistor and the source electrode of the first switch transistor satisfies that $|V3|>|Vth|$, wherein Vth is a threshold voltage of the first switch transistor; and wherein the third light-emitting brightness L3 satisfies that $L3>0$; and wherein in the third period, in response to determining that the first switch transistor operates in a cut-off region, the third potential difference V3 between the first control terminal and the first input terminal satisfies that $|V3|\leq|Vth|$; and wherein the third light-emitting brightness L3 satisfies that $L3=0$.

16. A display device, comprising a display panel;

wherein the display panel comprises a first display region and a second display region, wherein the first display region is reused as a sensor setting region;

wherein the first display region comprises a plurality of first sub-pixels which are provided with first pixel density; wherein the second display region comprises a plurality of second sub-pixels which are provided with second pixel density; wherein the first pixel density is lower than the second pixel density;

wherein in duration of one frame of display picture, a light-emitting phase of the plurality of first sub-pixels comprises a first light-emitting period, and a light-emitting phase of the plurality of second sub-pixels comprises a second light-emitting period; wherein for same target brightness, the plurality of first sub-pixels is configured to emit light with first light-emitting brightness during the first light-emitting period, and the plurality of second sub-pixels is configured to emit light with second light-emitting brightness during the second light-emitting period; and wherein the first light-emitting brightness L1 and the second light-emitting brightness L2 satisfy that L1>L2, and the first light-emitting period T1 and the second light-emitting period T2 satisfy that T1<T2.

17. The display device of claim 16, wherein the light-emitting phase of the plurality of first sub-pixels further comprises a third period, and the plurality of first sub-pixels emits light with third light-emitting brightness during the third period;

wherein the third light-emitting brightness L3 and the second light-emitting brightness L2 satisfy that L3<L2, and the first light-emitting period T1, the second light-emitting period T2, and the third period T3 satisfy that T1+T3=T2.

18. The display device of claim 17, wherein the first light-emitting period comprises a plurality of first light-emitting sub-periods, and the third period comprises a plurality of third sub-periods; and wherein in the light-emitting phase of the plurality of first sub-pixels, the plurality of first light-emitting sub-periods and the plurality of third sub-periods alternate in a manner of one first light-emitting sub-period followed by one third sub-period.

19. The display device of claim 18, wherein each of the plurality of third sub-periods t3 satisfies that 5 ms≤t3≤15 ms.

20. The display device of claim 17, wherein each of the plurality of first sub-pixels comprises a first light-emitting element, and each of the plurality of second sub-pixels comprises a second light-emitting element;

wherein for the same target brightness, the first light-emitting element is configured to receive a first driving current signal during the first light-emitting period, and the second light-emitting element is configured to receive a second driving current signal during the second light-emitting period; and the first light-emitting element is configured to receive a third driving current signal during the third period; and wherein the first driving current signal I1, the second driving current signal I2, and the third driving current signal I3 satisfy that I1>I2>I3.

* * * * *